(12) United States Patent
Howe

(10) Patent No.: US 7,039,164 B1
(45) Date of Patent: *May 2, 2006

(54) METHOD AND SYSTEM FOR REPORTING EVENTS IN TELECOMMUNICATION NETWORKS

(75) Inventor: Walter Wesley Howe, Alpharetta, GA (US)

(73) Assignee: GTE Wireless Service Corporation, Alpharetta, GA (US)

( * ) Notice: Subject to any disclaimer, the term of this patent is extended or adjusted under 35 U.S.C. 154(b) by 464 days.

This patent is subject to a terminal disclaimer.

(21) Appl. No.: 09/692,804

(22) Filed: Oct. 20, 2000

Related U.S. Application Data

(63) Continuation-in-part of application No. 09/418,436, filed on Oct. 14, 1999.

(51) Int. Cl.
*H04M 1/64* (2006.01)

(52) U.S. Cl. .................. 379/88.05; 379/76; 379/88.22; 455/414.1

(58) Field of Classification Search ................ 455/412, 455/413, 417, 422; 379/88.22, 88.05, 76, 379/67.1, 88.06
See application file for complete search history.

(56) References Cited

U.S. PATENT DOCUMENTS

| 4,191,860 | A | | 3/1980 | Weber ...................... 179/18 B |
| 4,756,020 | A | | 7/1988 | Fodale ........................ 379/112 |
| 5,353,331 | A | | 10/1994 | Emery et al. .................. 379/58 |
| 5,440,615 | A | * | 8/1995 | Caccuro et al. .......... 379/88.06 |
| 5,506,887 | A | | 4/1996 | Emery et al. .................. 379/58 |
| 5,574,904 | A | | 11/1996 | Yunoki et al. .............. 395/601 |
| 5,583,920 | A | * | 12/1996 | Wheeler, Jr. ............. 379/88.01 |
| 5,610,972 | A | | 3/1997 | Emery et al. .................. 379/58 |
| 5,664,005 | A | | 9/1997 | Emery et al. ............... 455/422 |
| 5,758,281 | A | | 5/1998 | Emery et al. ............... 455/428 |
| 6,070,080 | A | * | 5/2000 | Madour et al. ............. 455/458 |
| 6,088,429 | A | * | 7/2000 | Garcia, deceased ...... 379/88.22 |
| 6,259,782 | B1 | * | 7/2001 | Gallant .................. 379/211.01 |
| 6,327,363 | B1 | * | 12/2001 | Henderson et al. .... 379/265.01 |
| 6,496,570 | B1 | * | 12/2002 | Nimphius ................ 379/88.25 |

* cited by examiner

*Primary Examiner*—Fan Tsang
*Assistant Examiner*—Olisa Anwah
(74) *Attorney, Agent, or Firm*—Leonard C. Suchtya, Esq.; Joseph Palmieri, Esq.

(57) ABSTRACT

Methods and systems are provided for reporting to subscribers, wireless network events in a plurality of formats and languages depending upon the particular subscriber group to which a wireless subscriber belongs. When a subscriber requests a call, a switching node in the network invokes a trigger that identifies a location register for routing the call and sends a route request to the location register. While processing the route request, if the location register detects an event that would prevent the call from being routed, the location register identifies the subscriber group of the wireless subscriber and determines a directory number associated with the identified subscriber group and the detected event. The location register then returns the determined directory number to the switching node. Using the determined directory number, the switching node establishes the call to a message node, where a message associated with the determined directory number is executed. Accordingly, the wireless network reports the detected event in a format and language that the wireless subscriber, or an entity attempting to communicate with the wireless subscriber, can recognize.

39 Claims, 24 Drawing Sheets

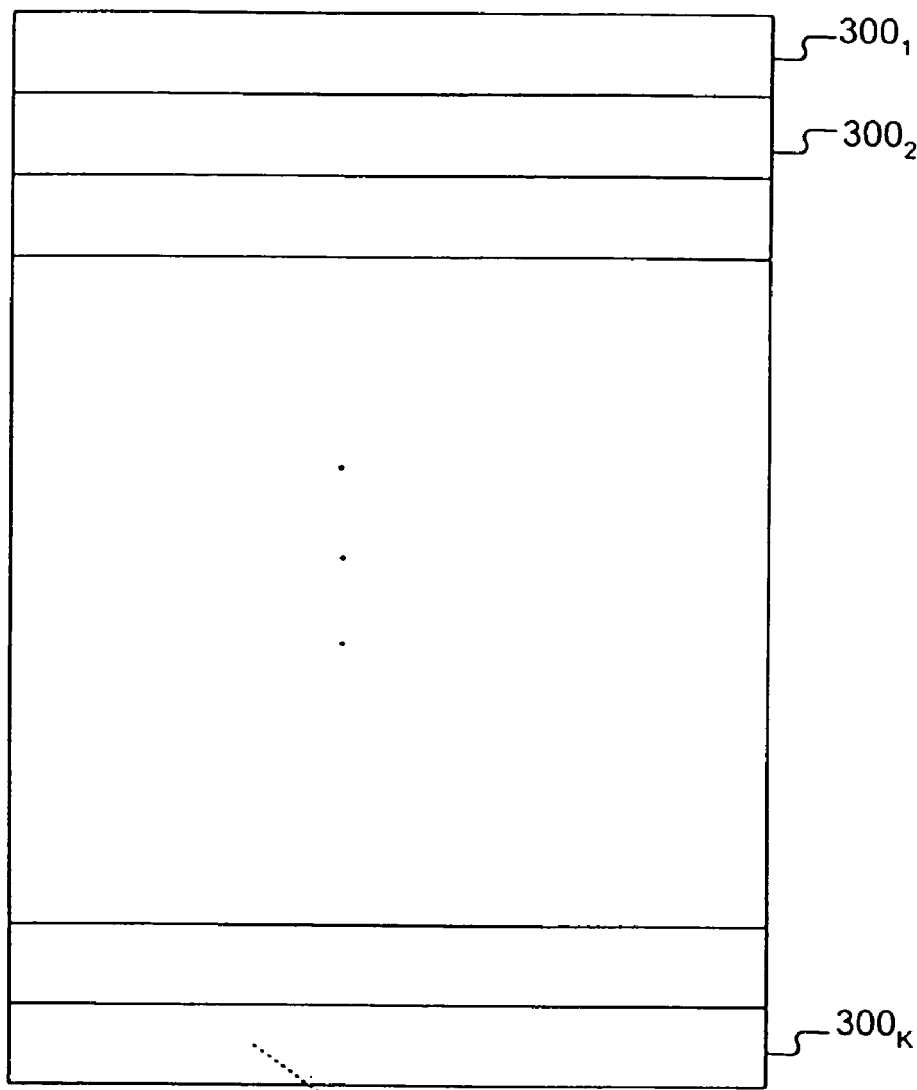
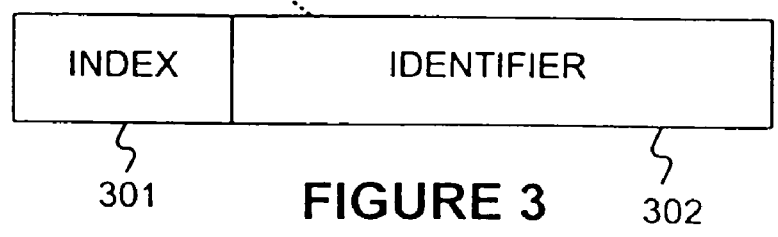
FIGURE 3

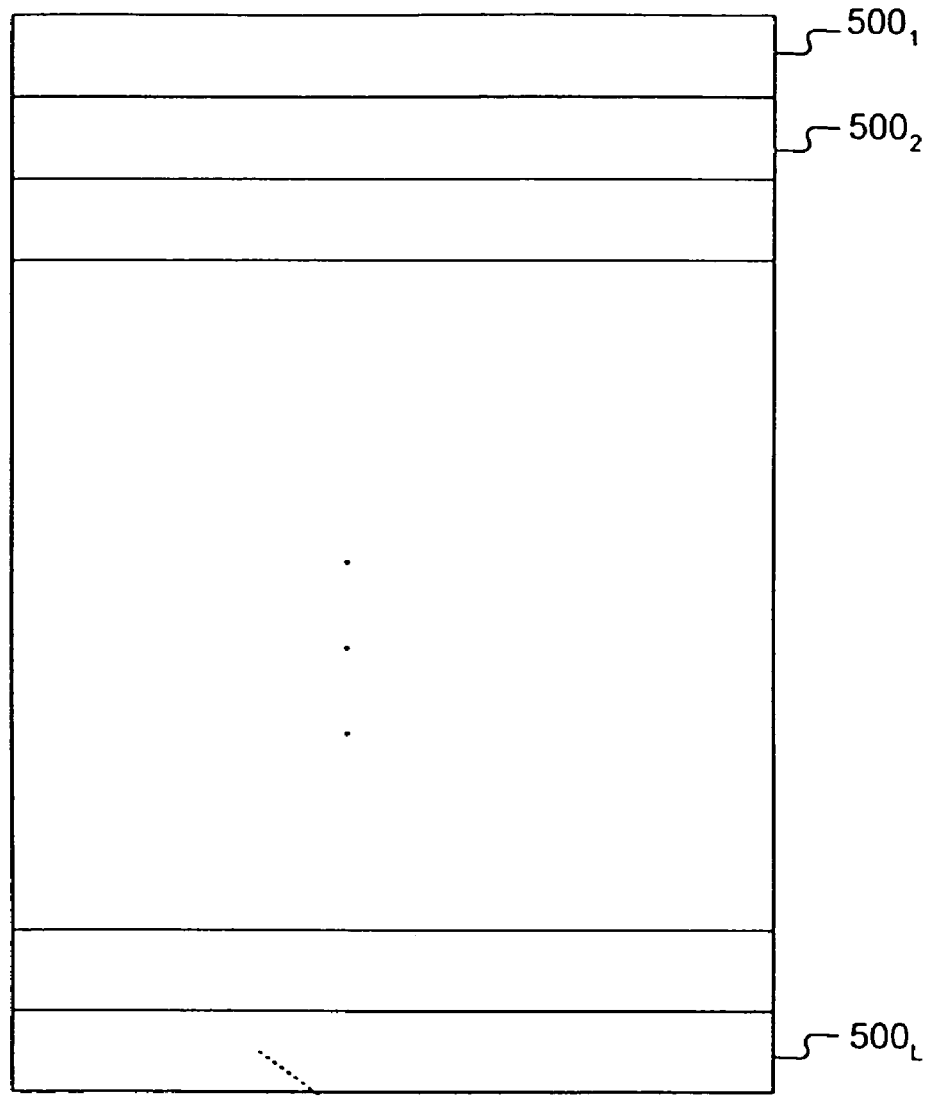
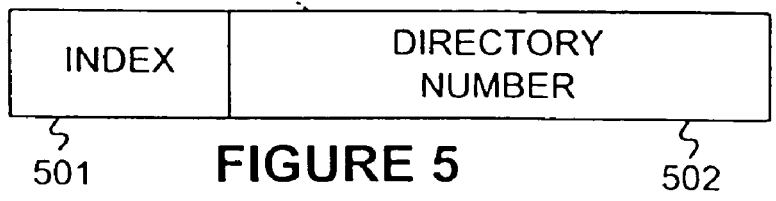
FIGURE 5

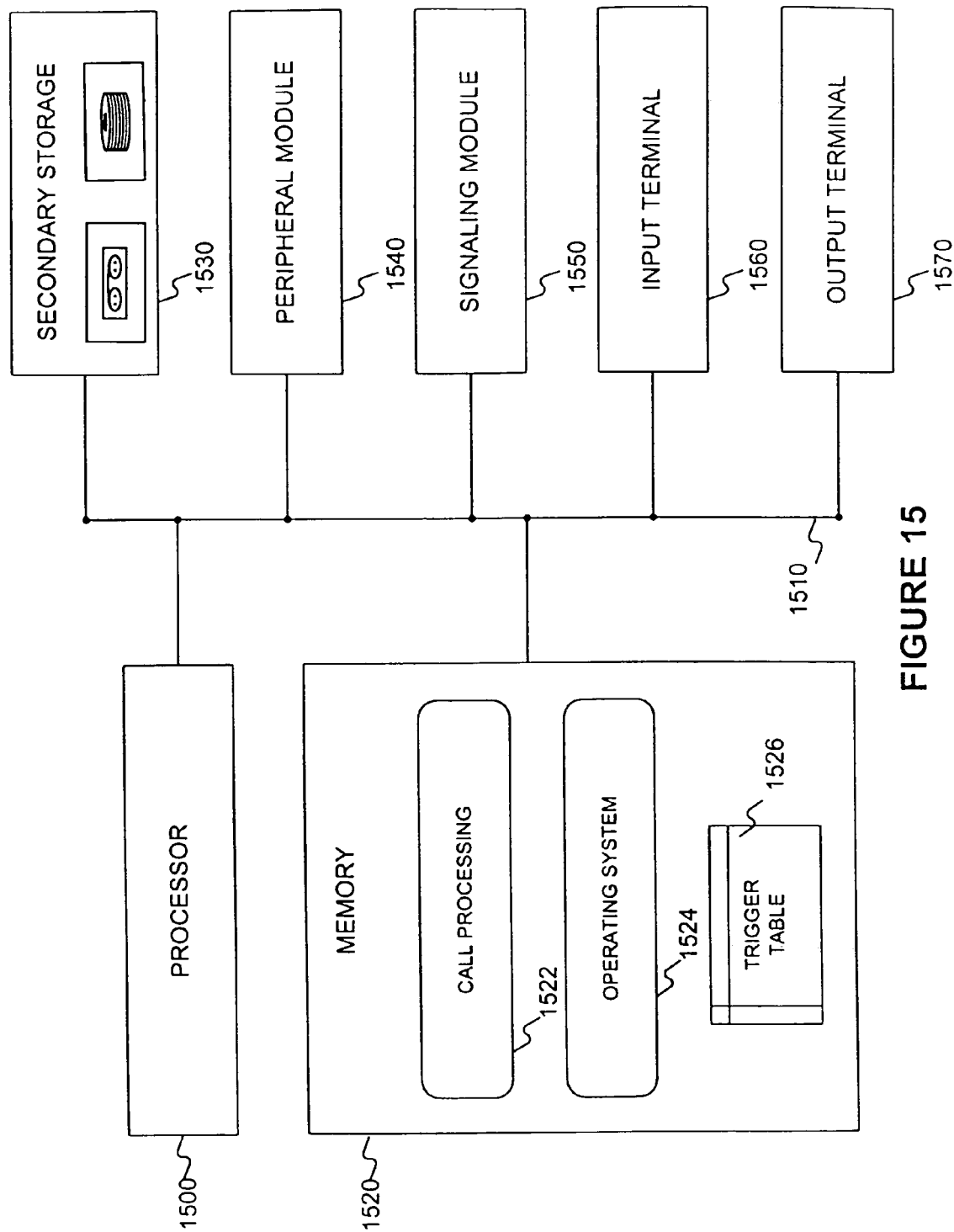

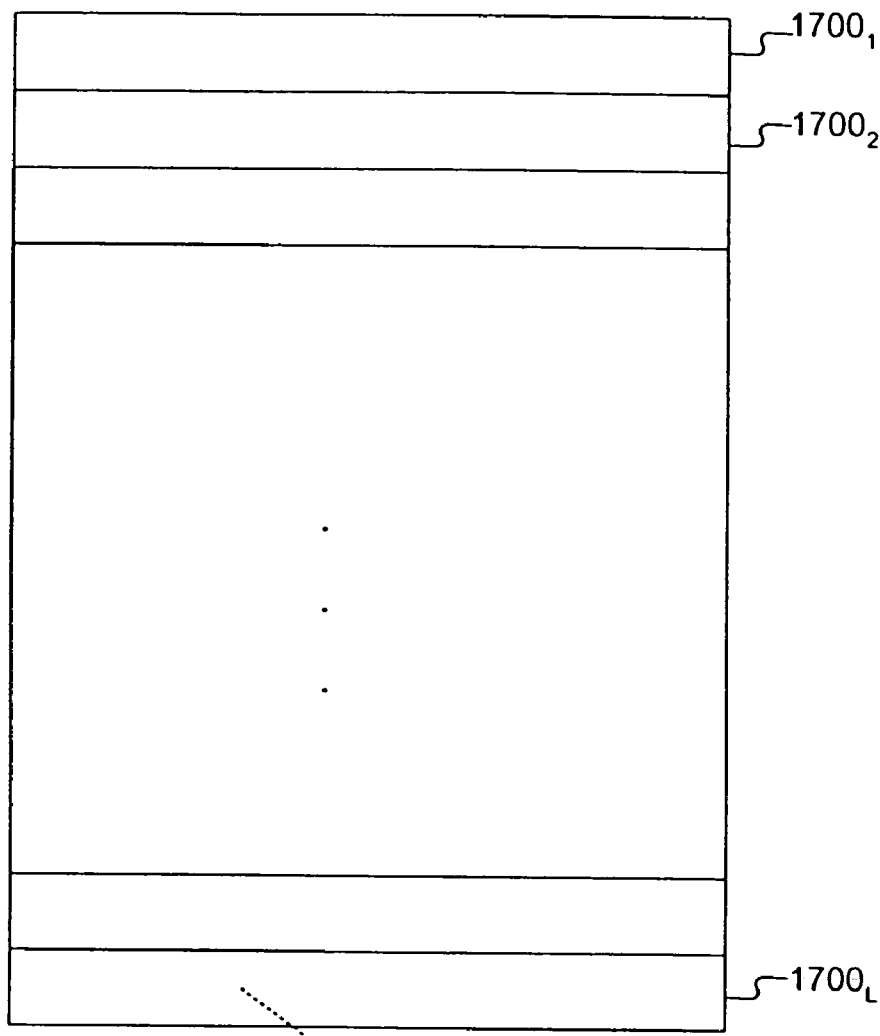
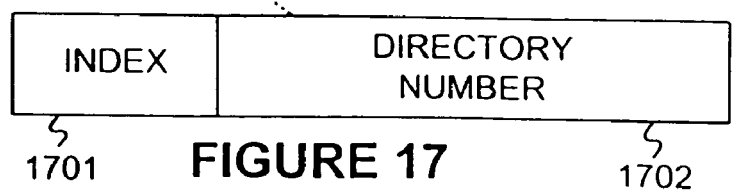
FIGURE 17

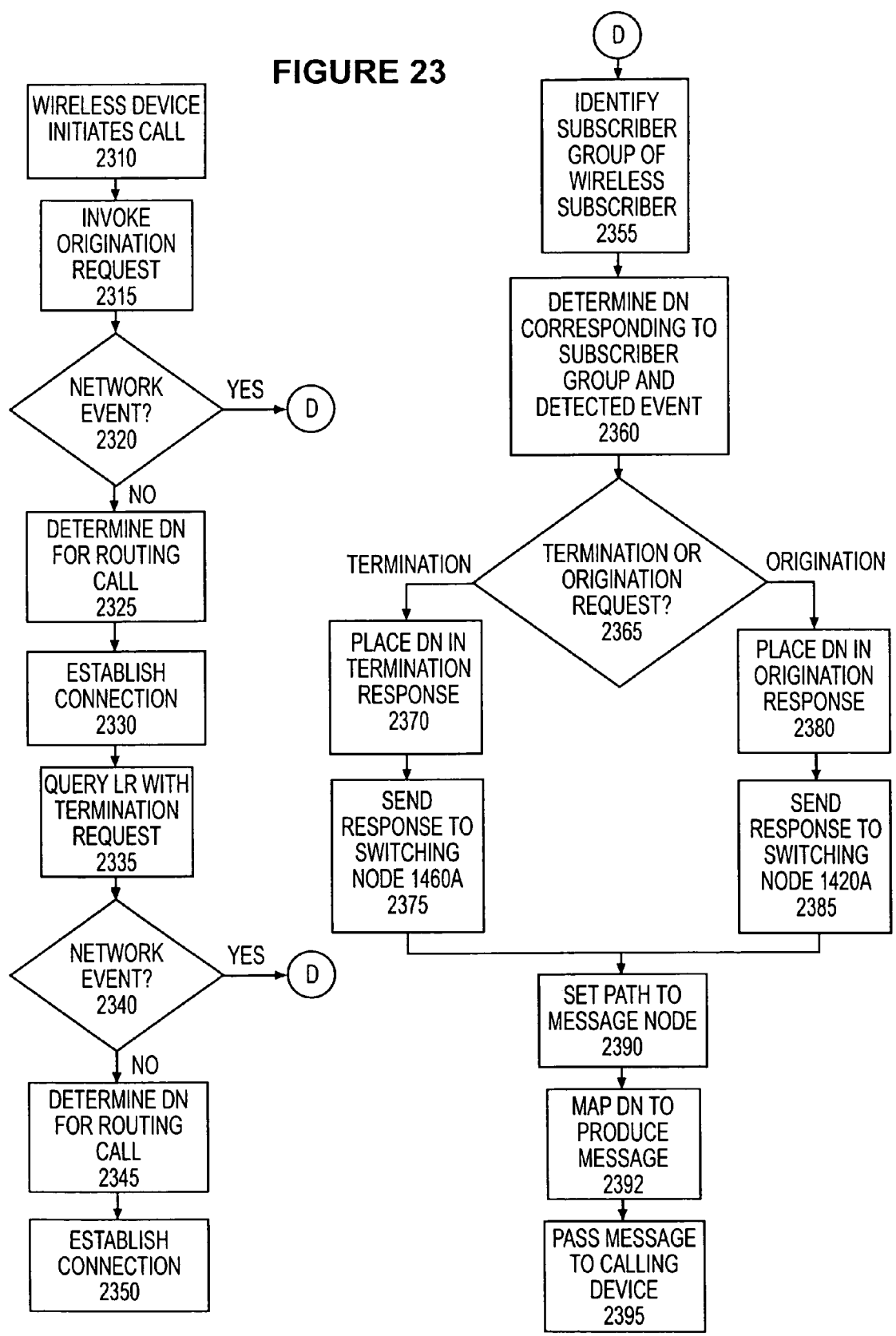

US 7,039,164 B1

METHOD AND SYSTEM FOR REPORTING EVENTS IN TELECOMMUNICATION NETWORKS

RELATED APPLICATIONS

The present application is a continuation-in-part of application Ser. No. 09/418,436, filed Oct. 14, 1999.

BACKGROUND OF THE INVENTION

1. Field of the Invention

The present invention relates to telecommunication networks and, more particularly, to a method and system for reporting events to subscribers in telecommunication networks.

2. Background of the Art

Telecommunication networks use various signaling systems for establishing calls between subscribers. At times, however, the networks may detect certain states or events that would prevent the networks from establishing calls between subscribers. These events may include, for example, when a called directory number is out of service, network lines are busy or down, a switching node experiences a problem, etc. In such instances, the networks instead report the detected events to the subscribers by playing prerecorded audible messages.

Specifically, when a subscriber places a call to another subscriber in a network, a switching node local to the calling subscriber receives a call request from the calling subscriber's device. The switching node then sends a route request to a signaling node in the network to determine a route for the call. If the signaling node determines a route, the signaling node returns to the switching node the directory number of the next node in the network through which the call must be routed. Otherwise, if the signaling node detects that the call cannot be established or routed such as when the called subscriber's directory number is out of service, the signaling node returns an error code to the switching node. The switching node then notifies the subscriber that the requested call cannot be established by playing a prerecorded audible message corresponding to the error code.

Although audible messages may be sufficient for reporting events to subscribers who use plain ordinary telephone service (POTS) telephone sets, such messages are not universally recognizable by all subscriber devices. For example, consider a subscriber who uses a telecommunications device for the deaf (TDD) to place calls to other subscribers in the network. When the network plays an audible message to report an event, neither the subscriber nor the TDD device would be able to recognize the message. Similarly, an application running in a desktop computer for dialing into, for example, a local Internet Service Provider (ISP) system cannot recognize audible messages received from the network or present such messages in a form that is recognizable to a subscriber.

In present wireline telecommunications networks, a wireline telephone number or directory number (DN) is associated with a fixed geographic location and is served by a single wireline switch. A wireless DN, however, is associated with multiple geographic locations and is served by any one of a number of wireless switches depending on the specific geographic location of the associated wireless device at the time a call is made. This portability of a wireless DN is one of the basic attributes of wireless telephony.

A home location register and visited location register in a telecommunications network provide seamless roaming when a call is placed to or from a wireless DN. A home location register is associated with a home wireless switch where a wireless DN resides (i.e., the wireless switch to which all incoming calls to the wireless DN are directed). A wireless device is located within its home area when the wireless device can directly communicate with its associated home wireless switch (i.e., located in the area covered by the home wireless switch).

A visitor location register is associated with a wireless switch currently serving a wireless device that is outside of its home area. A wireless device is outside of its home area (or roams) when the wireless device cannot directly communicate with the home wireless switch and instead communicates with another wireless switch, which is referred to as a visited wireless switch.

In telecommunication networks two connections must be established when a call is placed to a wireless DN whose associated wireless device is outside of its home area. In such instances, the telecommunications network first establishes a connection to the home wireless switch associated with the wireless DN. The home wireless switch then establishes a second connection to a visited wireless switch that currently serves the wireless DN. When errors, such as missing information, misrouted query and other process failures are encountered, a numerical error value is returned to the requester representing the reason for the failure.

There are multiple messages used in wireless intelligent networks (WIN) that route call requests from wireless subscribers or from users who use audible devices such as, plain ordinary telephone service (POTS) telephone sets, attempting to communicate with the wireless subscribers. These include, but are not limited to, the LocationRequest, RoutingRequest, OriginationRequest and TerminationRequest messages described in "Interim Standard 41" (IS-41). The IS-41 standard is described in "Radio Telecommunications Intersystem Operations," ANSI/TIA/EIA/41-D-1997, which is incorporated herein by reference. Although used in different circumstances, each of these messages ultimately requests a Directory Number which to route the call requests.

As an illustration, FIG. 10 shows a block diagram of a conventional Telecommunication network (1000) implementing the LocationRequest, RoutingRequest messages. Telecommunications network 1000 comprises a wireline switch 1020, a home wireless switch 1040, a home location register (HLR) 1050, signal transfer points (STPs) 1060, 1087 and 1057, a visitor location register (VLR)1070, a visited wireless switch 1080, a wireline telephone 1010, antenna 1090, and a wireless device 1095.

Typically, a wireline subscriber using telephone 1010 initiates a call request by dialing the wireless DN associated with wireless device 1095, temporarily located in a visited system controlled by visited wireless switch 1080. The request is sent to wireline switch 1020 over existing connection 1000a, where it examines the DN to determine its status (resident or non-resident). When wireline switch recognizes the non-resident status of the number, it routes the request 1000b to Public switch Telephone Network/Interchange Carrier (PSTN/IXC) 1030 over existing connection 1000b. PSTN/IXC 1030 examines the dialed number and routes it to home wireless switch 1040, using existing connection 1000c.

Home wireless switch 1040 recognizes the DN as one that it is not currently serving, and sends an IS-41 LocationRequest message 1000d to HLR 1050, possibly through STP 1057. HLR 1050 examines its database and determines that the wireless device 1095 is being served by VLR 1070, which is associated with the visited wireless switch 1080. HLR 1050 sends an IS-41 RoutingRequest 1000e to VLR 1070, possibly by way of STP 1060.

VLR 1070 consults its internal database and allocates a Temporary Local Directory Number (TLDN) from a pool of available numbers associated with visited wireless switch 1080 currently serving wireless device 1095. The TLDN is populated into the response to the RoutingRequest 1000e and sent back to HLR 1050 as RoutingRequest response 1000f, possibly by way of STP 1060.

HLR 1050 takes the TLDN from the RoutingRequest response 1000f and populates it into the response to the LocationRequest 1000d from home wireless switch 1040, as LocationRequest response 1000g. Home wireless switch 1040 examines the LocationRequest response 1000g and establishes the route to the TLDN by way of PSTN/IX 1035. The PSTN/IX 1035 establishes a route to the visited wireless switch 1070 and passes the call via connection 1000i. The visited wireless switch 1080 sends a RoutingRequest 1000j to VLR 1070 possibly through STP 1087, and receives a response 1000k containing a mobile identification number (MIN) previously associated with the TLDN populated into RoutingRequest response 1000f. The visited wireless switch 1070 then routes the call to the wireless device 1095 by way of antenna 1090 using internal routing 10001. Thus, wireline telephone 1010 is connected to wireless device 1095 by a voice path consisting of a subscriber line 1000a, wireline switch 1020, connection 1000b, PSTN/IX 1030, connection 1000c, home wireless switch 1040, connection 1000h, PSTN/IX 1035, connection 1000i, visited wireless switch 1080, internal connection 10001, and antenna 1090.

It should be noted that STPs 1057, 1060 and 1087 may represent one or more STPs that are required to perform the transfer of messages. Furthermore, the communications between VLR 1070 and HLR 1050, visited wireless switch 1080 and VLR 1070, and between home wireless switch 1040 and HLR 1050, may take place without STPs 1060, 1087 and 1057, respectively.

Event reporting (including error handling) occurs whereby an error code is returned in the response to either the RoutingRequest or LocationRequest (depending on the entity encountering the exception condition). This error would propagate back to the original requesting party, the home wireless switch 1040, which would map the event/error to one of the standard recordings already available on the switch. Examples of events that might be reported are Subscriber Not available [No Page Response], No Capacity [Resource Shortage] and Busy.

FIG. 11 shows a block diagram of a conventional Telecommunication network (1100) implementing the OriginationRequest message. Telecommunications network 1100 comprises a wireline switch 1180, a home location register 1160, signal transfer points (STPs) 1150 and 1147, a visitor location register 1140, a visited wireless switch 1130, a wireline telephone 1190, antenna 1120, and a wireless device 1110.

Typically, wireless device 1110 originates a call at visited wireless switch 1130 by way of antenna 1120 and existing internal connectivity 1100a. Visited wireless switch 1130 recognizes parameters previously provided by home location register (HLR) 1160, causing an origination trigger to be invoked, which locates a visited location register (VLR) associated with the visited wireless switch 1130. This results in an OriginationRequest 1100b to be sent to VLR 1140, possibly through STP 1147.

VLR 1140 passes the OriginationRequest 1100b to HLR 1160, possibly by way of STP 1150. HLR consults its internal tables and routing information to determine if the dialed call is allowed, possibly substituting a different destination number into a OriginationRequest response 1100c. The OriginationRequest response 1100c is passed back to the visited wireless switch 1130 by way of VLR 1140 and possibly STPs 1150 and 1147.

It should be noted that STPs 1150 and 1147 may represent one or more STPs that are required to perform the transfer of messages. Furthermore, the communications between VLR 1140 and HLR 1160, and visited wireless switch 1130 and VLR 1140, may take place without STPs 1150 and 1147, respectively.

The visited wireless switch 1130 routes the call to the destination number returned in the OriginationRequest response 1100c by way of existing connection 1100d to PSTN/IX 1170. The call is routed by PSTN/IX 1170 to wireline switch 1180, where the destination number resides, by way of existing connection 1100e. Wireline switch 1180 routes the call to wireline telephone 1190.

The overall differentiation here from an ordinary wireless call is that each call made by the wireless device 1110 is validated by HLR 1160, and the actual destination connected to is that specified by HLR 1160 through the destination number contained in the OriginationRequest response 1100c, which may be the same or different from the number dialed by the wireless device 1110.

Analogous to the description of FIG. 10, event reporting (including error handling) occurs whereby an error code is returned in the response to the OriginationRequest. This error would propagate back to the original requesting party, the visited wireless switch 1130, which would map the event/error to one of the standard recordings already available on the switch. Examples of events that might be reported are No Capacity [Resource Shortage] and Unassigned Directory Number.

FIG. 12 shows a block diagram of a conventional Telecommunication network 1200 implementing the TerminationRequest message. Telecommunications network 1200 comprises a wireline switch 1220, PSTN network 1230, a home wireless switch 1240, a home location register 1250, STP 1257, a wireline telephone 1210, antenna 1260, and a wireless device 1270.

Typically, a wireline telephone 1210 attempts to place a call to wireless device 1270 by utilizing existing connection 1200a to wireline switch 1220. Wireline switch 1220 routes the call through existing connection 1200b to PSTN/IX 1230. PSTN/IX 1230, using existing connection 1200c, passes the call to home wireless switch 1240. Home wireless switch 1240 recognizes parameters previously provided by HLR 1250, causing a termination trigger to be invoked, which locates a HLR associated with the visited wireless switch 1230, in this case HLR 1250. Home wireless switch 1240 subsequently provides a TerminationRequest 1200d to HLR 1250, possibly through STP 1257.

HLR 1250 consults internal tables and routing information to determine if the dialed call is allowed, and possibly substitutes a different phone number into a TerminationRequest response 1200e. The TerminationRequest response 1200e is passed back to the home wireless switch 1240, possibly through STP 1257. The home wireless switch 1240 may then route the call to the wireless device 1270 by way of internal connection 1200f and antenna 1260. The advance described here is the ability of HLR 1250 to examine the call attempt to the wireless device 1270 and specify the actual termination directory number.

It should be noted that STP 1257 may represent one or more STPs that are required to perform the transfer of messages. Furthermore, the communications between home wireless switch 1240 and HLR 1250, may take place without STP 1257.

Similar to the description of FIGS. 10 and 11, event reporting (including error handling) occurs whereby an error code is returned in the response to the TerminationRequest. This error would propagate back to the original requesting party, the home wireless switch 1240, which would map the event/error to one of the standard recordings already available on the switch. Examples of events that might be reported are No Capacity [Resource Shortage] and Unassigned Directory Number.

With reference to the networks described in FIGS. 10–12, problems arise in returning the reason for the failure to the party that originated the call, enabling them to correct their actions, if possible, and retry their call. Current technology provides only for the requester to interpret the error value according to a standard definition and provide their own routing to an audible error message. Because of using only a fixed audible recording technology for the error report, automated and data-only calls may fail to provide usable information to the call originator. For example, an audible message has little value to a hearing impaired user attempting a call using a Telecommunications Device for the Deaf (TDD). Similarly, an application running in a desktop computer for dialing into, for example, a local Internet Service Provider (ISP) system cannot recognize audible messages received from the network or present such messages in a form that is recognizable to the wireless subscriber. With calls in a wireless intelligent network originating from multiple sources and performing requests for routing information from multiple sources, the problem of providing this information in a meaningful format for specific users grows geometrically with the size of the Intelligent Network (IN). Additionally, error sources that are not specific to the IN but may be meaningful to the applications cannot be reported without expanding the standard offering for the IN.

As yet another example, consider subscriber devices used in automotive telemetric or remote reading applications. In such applications, subscriber devices send and receive data from remote systems by automatically placing calls over existing networks. However, since these subscriber devices cannot process the audible messages that are reported by the networks, they cannot provide the subscriber with informative as to the cause of most communication failures. Furthermore, these subscriber devices cannot automatically take corrective actions in response to most communication failures. Corrective actions may include, for example, redialing a directory number when network lines are busy or dialing a different directory number when a previously dialed directory number is temporarily out of service. As the number of subscribers who use these and other devices that cannot process audible messages increases, the need for reporting network events in formats that subscriber devices can process grows accordingly.

Furthermore, even with respect to those users who use audible devices such as, plain ordinary telephone service (POTS) telephone sets, to communicate with wireless subscribers there is a need to provide audible messages in languages that both the users and subscribers can understand. For example, a Spanish speaking subscriber may wish to receive audible messages in Spanish, whereas a French speaking subscriber may wish to receive audible messages in French. The utility of this process recognizes that if a wireless subscriber utilizes a special data type (such as TDD), or language (such as French), for communication, then those who wish to communicate with the wireless subscriber will also be expecting the same format.

SUMMARY OF THE INVENTION

It is therefore desirable to have a method and system for reporting events in formats and languages that are recognizable by subscribers in telecommunication networks.

Methods and systems consistent with the present invention report network events to subscribers in a plurality of formats and languages depending upon the particular subscriber group to which a subscriber belongs. When an event is detected, such methods and systems identify a subscriber's group, determine a directory number associated with the identified group and the detected event, and report to the subscriber a message associated with the determined directory number.

In accordance with an embodiment of the invention, a switching node is configured with a trigger that designates a signaling node in the network for routing call requests received by the switching node from subscribers in the network. The designated signaling node is configured with a directory number mapping table that includes a plurality of predetermined directory numbers indexed according to events, which when detected are reported to the calling subscribers such as, when a subscriber's directory number is out of service, network lines are busy or out of service, etc. These predetermined director numbers are further indexed according to subscriber groups in the network.

The predetermined directory numbers are selected so that they terminate at a message node such as, a messaging system, in the network, where a plurality of stored messages are associated with the predetermined directory numbers, respectively. These messages may be stored in a plurality of formats and languages such as, voice, data, telecommunications for the deaf (TDD), English, Spanish, etc. depending upon the particular subscriber groups in the network.

When a switching node receives a request for a call from a calling subscriber to a called subscriber, the switching node invokes the trigger configured therein to identify the signaling node designated for routing calls from the calling subscriber and sends a route request to the identified signaling node. While processing the route request, if the signaling node detects an event that should be reported to the calling subscriber, the signaling node identifies the subscriber group associated with the calling subscriber. The signaling node then selects a directory number from the directory number mapping table based on the detected event and the identified subscriber group and returns the selected directory number to the switching node. Based on the directory number received from the signaling node, the switching node establishes a call between the calling subscriber and the message node, where a message associated with the directory number is executed.

Accordingly, the network reports the detected event in a format and language that the calling subscriber or its device can recognize. As an illustration, when a calling subscriber dials a directory number and the network detects an event such as, an error that must be reported to the calling subscriber, that event is reported in a TDD format to a calling subscriber using a TDD device, whereas the same event is reported in a voice format to a calling subscriber using a POTS telephone set. Furthermore, events are reported in English to a calling subscriber whose subscriber group profile indicates that events should be reported in English, whereas the same events are reported in Spanish to a calling subscriber whose subscriber group profile indicates that events should be reported in Spanish.

In an alternate embodiment of the present invention, the event reporting techniques are implemented in a wireless telecommunications environment. In accordance with this embodiment of the invention, a switching node passes call requests to a designated location register in the network for routing the call requests received by the switching node from entities attempting to communicate with wireless subscribers in the network. The designated location register is configured with a directory number mapping table that includes a plurality of predetermined directory numbers indexed according to events, which when detected, are reported to the entities attempting to communicate with the wireless subscribers. These events include, but are not limited to, Subscriber Not Available [No Page Response], No Capacity [Resource Shortage] and Busy. These predetermined directory numbers are further indexed according to subscriber groups in the network.

The predetermined directory numbers are selected so that they terminate at a message node such as, a messaging system, in the network, where a plurality of stored messages are associated with the predetermined directory numbers, respectively. These messages may be stored in a plurality of formats and languages such as, voice, data, telecommunications for the deaf (TDD), English, Spanish, etc. depending upon the particular subscriber groups in the network.

When a switching node receives a request for a call from a calling wireless subscriber to a called user or device, the switching node invokes the trigger configured therein to identify a location register designated for routing calls from the calling wireless subscriber and sends a request to the identified location register. While processing the request, if the location register detects an event that should be reported to the calling wireless subscriber, the location register identifies the subscriber group associated with the calling subscriber. The location register then selects a directory number from the directory number mapping table based on the detected event and the identified subscriber group and returns the selected directory number to the switching node. Based on the directory number received from the location register, the switching node establishes a call between the calling wireless subscriber and a message node, where a message associated with the directory number is executed.

Accordingly, the network reports the detected event in a format and language that the calling wireless subscriber or its device can recognize. As an illustration, when a calling wireless subscriber dials a directory number and the network detects an event such as, an error that must be reported to the calling subscriber, that event is reported in a TDD format to a calling subscriber using a TDD device, whereas the same event is reported in a voice format to a calling subscriber using a POTS telephone set. Furthermore, events are reported in English to a calling subscriber whose subscriber group profile indicates that events should be reported in English, whereas the same events are reported in Spanish to a calling subscriber whose subscriber group profile indicates that events should be reported in Spanish.

Additionally, the network reports the detected event in a format and language that a calling user, or device, attempting to communicate with a wireless subscriber using a TDD device, can recognize. As an illustration, when a calling entity dials a directory number and the network detects an event such as, an error that must be reported to the calling entity, that event is reported in a TDD format, whereas the same event is reported in a voice format to a calling entity attempting to communicate with a wireless subscriber using a POTS telephone set. Furthermore, events are reported in English to a calling entity attempting to communicate with a subscriber whose subscriber group profile indicates that events should be reported in English, whereas the same events are reported in Spanish to a calling entity attempting to communicate with a wireless subscriber whose subscriber group profile indicates that events should be reported in Spanish.

BRIEF DESCRIPTION OF THE DRAWINGS

The foregoing summary and the following detailed description should not restrict the scope of the claimed invention. Both provide examples and explanations to enable others to practice the invention. The accompanying drawings, which form part of the description of the invention, show several embodiments of the invention, and together with the description, explain the principles of the invention.

In the Figures:

FIG. 3 is a block diagram of a trigger table in a switching node, in accordance with methods and systems consistent with the invention;

FIG. 5 is a block diagram of a directory number mapping table in a signaling node, in accordance with methods and systems consistent with the invention;

FIG. 15 is a block diagram of a wireless switching node in a wireless telecommunication network, in accordance with methods and systems consistent with the invention;

FIG. 17 is a block diagram of a directory number mapping table in a home location register, in accordance with methods and systems consistent with the invention;

FIG. 23 is a flow chart of the steps performed when a wireless device attempts to contact another wireless device, in accordance with methods and systems consistent with the invention.

DETAILED DESCRIPTION

The following description of embodiments of this invention refers to the accompanying drawings. Where appropriate, the same reference numbers in different drawings refer to the same or similar elements.

In accordance with an embodiment of the invention, a network is configured such that network events are reported to subscribers in a plurality of formats and languages depending upon the particular subscriber group to which a subscriber belongs. When a switching node in the network receives a call request from a subscriber, a trigger in the switching node is invoked to identify a designated signaling node for routing the call. The switching node then sends a route request to the signaling node. If during processing of the route request the signaling node detects an event that should be reported to the subscriber, the signaling node identifies the subscriber group associated with the subscriber. The signaling node then selects from a directory mapping table a directory number associated with the identified subscriber group and the detected event and returns the selected directory number to the switching node. Switching node then establishes the call to the message node, where a message associated with the determined directory number is executed.

Figure 1:
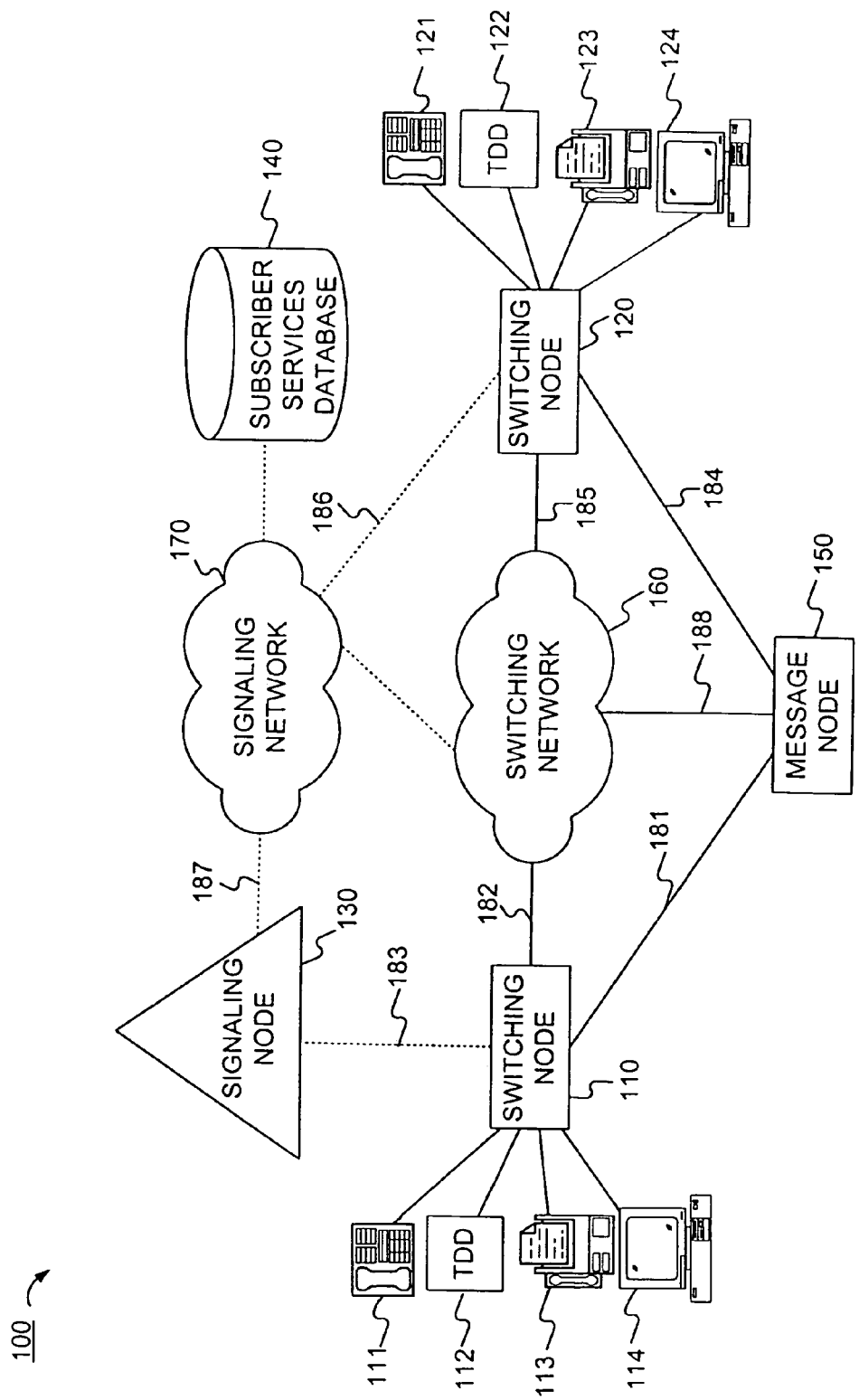
FIG. 1 is a block diagram of a telecommunications network, in accordance with methods and systems consistent with the invention.

FIG. 1 shows a block diagram of a telecommunications network 100, in accordance with methods and systems consistent with the invention. As shown, network 100 comprises switching nodes 110 and 120, a signaling node 130, a subscriber services database 140, a message node 150, a switching network 160, and a signaling network 170.

Switching node 110 connects via links 181, 182, and 183 to message node 150, switching network 160, and signaling node 130, respectively. Links 181 and 182 include, for example, N lines $181_1$–$181_N$ and $182_1$–$182_N$ (not shown), respectively. Switching node 110 also connects via local loops to a telephone 111, telecommunications for the deaf (TDD) device 112, facsimile machine 113, and a desktop computer 114.

Switching node 110 may include, for example, a 5ESS™, DMS-100™ (or DMS-200™), GTD-5™ or an EWSD™ switching system manufactured by Lucent Technologies, Inc., Nortel Networks Corporation, AGCS, and Siemens, respectively. As explained below in detail, switching node 110 is configured to request routing information from signaling node 130 when switching node 110 receives call requests from telephone 111, TDD device 112, facsimile machine 113, and desktop computer 114.

Similarly, switching node 120 connects via links 184, 185, and 186 to message node 150, switching network 160, and signaling network 170, respectively. Switching node 120 also connects via local loops to a telephone 121, TDD device 122, facsimile machine 123, and a desktop computer 124.

Signaling node 130 interfaces subscriber services database 140 via signaling network 170. Signaling node 130 may include a Service Control Point (SCP) such as, AI-NET™, Integrated Service Control Point (ISCP™), or Service Builder™ equipment/software manufactured or provided by Lucent Technologies, Inc., Telcordia Technologies, Inc., and Nortel Networks Corporation, respectively.

Subscriber services database 140 stores information about subscriber services and may include, for example, a line information database (LIDB), call management services database (CMSDB), and/or business services database (BSDB). The LIDB, CMSDB, and BSDB are defined in Bellcore (now Telcordia Technologies, Inc.) publication TR-NWT-001244, "Supplemental Service Control Point (SCP)."

Message node 150 may include, for example, a messaging system, which includes messages in a plurality of formats such as, voice, data, and TDD, and in a plurality of languages such as, English, Spanish, French, etc. Alternatively, message node 150 may be a workstation, which includes a plurality of stored messages and a bank of modems for receiving calls from switching nodes 110 and 120 and switching network 160.

Switching network 160 and signaling network 170 may include, for example, a Public Switched Telephone Network (PSTN) and a Signaling System 7 (SS7) network, respectively.

Figure 2:
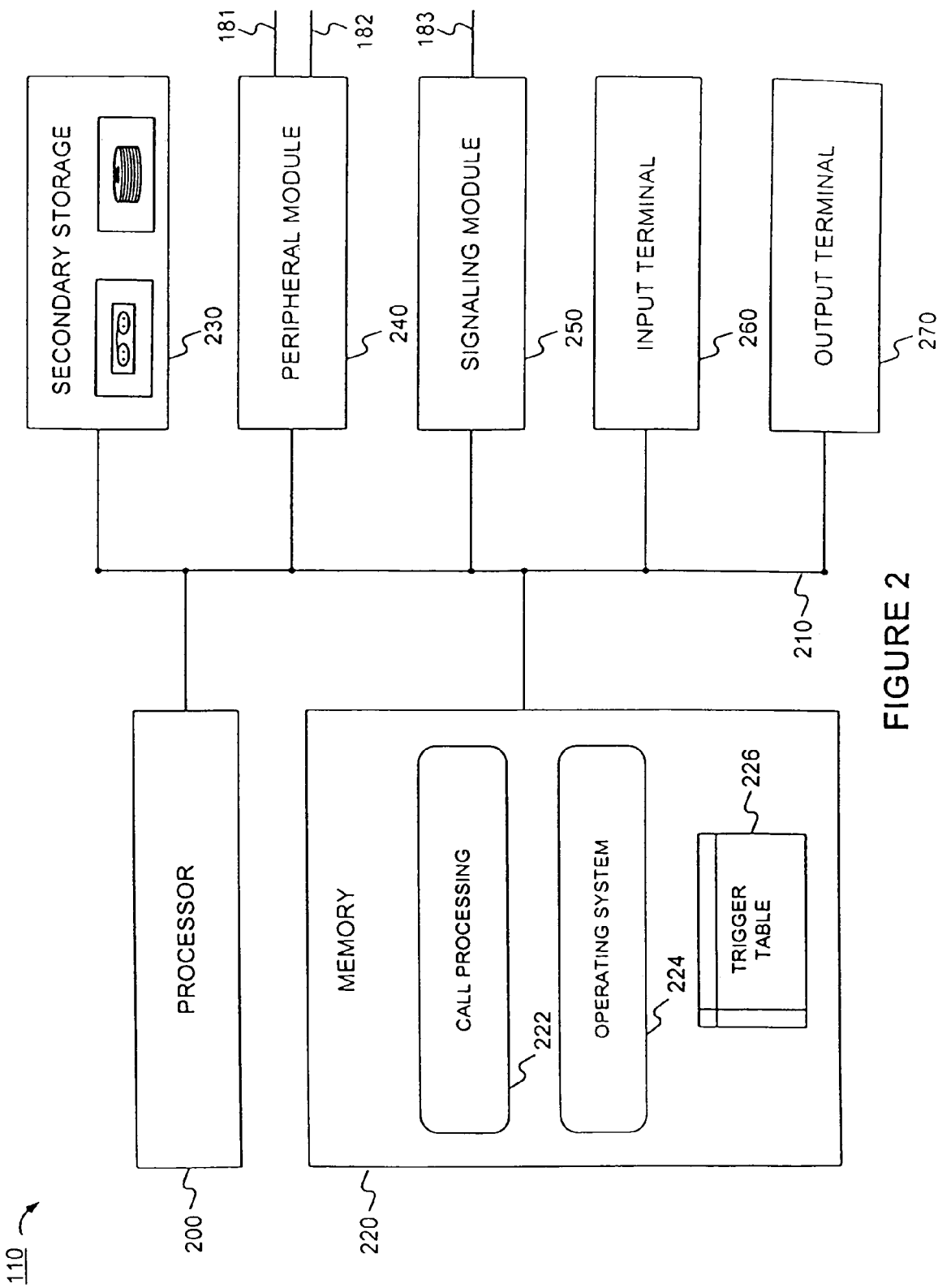
FIG. 2 is a block diagram of a switching node in a telecommunications network, in accordance with methods and systems consistent with the invention.

FIG. 2 is a block diagram of switching node 110, in accordance with methods and systems consistent with the invention. Switching node 110 comprises a processor 200, which connects via bus 210 to a memory 220, a secondary storage 230, a peripheral module 240, a signaling module 250, and input terminal 260, and an output terminal 270.

Memory 220 includes a call processing module 222, an operating system 224, and a trigger table 226. Call processing module 222 includes data and software executed by processor 200 for establishing, maintaining, and terminating calls between subscribers in network 100. Operating system 224 includes data and software executed by processor 200 for non-switching functions, which include, for example, task scheduling and processor interrupt handling. As explained below in detail, trigger table 226 includes entries that are used to intercept call requests in switching node 110 and to identify the associated signaling nodes such as, signaling node 130, for routing the requested calls in network 100.

Secondary storage 230 includes a computer readable medium such as a disk drive and a tape drive. From the tape drive, software and data may be loaded onto the disk drive, which can then be copied into memory 220. Similarly, software and data in memory 220 may be copied onto the disk drive, which can then be loaded onto the tape drive.

Peripheral interface module 240 interfaces with links 181 and 182, which connect switching node 110 to message node 150 and switching network 160, respectively.

Signaling interface module 250 transmits to and receives from signaling node 130 signaling information such as, Advanced Intelligent Network (AIN) messages. For example, signaling interface module 250 converts signaling information generated by call processing module 222 into AIN messages and transmits the messages to signaling node 130. Likewise, signaling interface module 250 receives AIN messages from signaling node 130 and converts the messages into an internal format for processing by call processing module 222.

Input terminal 260 may include an input device such as, a keyboard, and output terminal 270 may include a display device.

FIG. 3 is a block diagram of trigger table 226, in accordance with methods and systems consistent with the invention. Trigger table 226 includes K predetermined triggers shown as entries $300_1$–$300_K$, where each entry includes an index field 301 and an identifier field 302. In an embodiment where triggers $300_1$–$300_K$ are Public Office Dialing Plan (PODP) triggers, an index field 301 may include a 3, 6, or 10 digit string such as, an area code, an area code and an office code, or a directory number. PODP triggers are described in AIN 0.1 standards TR-NWT-001284: Advanced Intelligent Network (AIN) 0.1 Switching System Generic Requirements, Issue 1 (August 1992) and TR-NWT-001285: Advanced Intelligent Network (AIN) 0.1 Service Control Point (SCP) Application Protocol Interface Requirements, Issue 1 (August 1992), both of which are incorporated herein by reference.

Alternatively, in an embodiment where triggers $300_1$–$300_K$ are Specific Digit String (SDS) triggers, an index field 301 may include any sequence of digits. SDS triggers are described in AIN 0.2 standards GR-1298-CORE: AIN SSP, AINGR: Switching Systems (A Module Of AINGR, FR-15), Issue 4 (September 1997) and GR-1299-CORE: AINGR: Switch-Service Control Point (SCP)/Adjunct Interface (A Module Of AINGR, FR-15), Issue 4 (September 1997), both of which are incorporated herein by reference.

An identifier field 302 includes a numeric string that identifies a signaling node associated with a calling subscriber's directory number whose area code, area code and office code, or directory number matches the associated an index field 301 in trigger table 226. For example, trigger table 226 may be configured to include a trigger entry $300_K$, where index field $301_K$ includes the area code associated with telephone 111 and identifier field $302_K$ includes a translation type/global title address (TT/GTA) associated with signaling node 130. The TT/GTA may then be communicated to a signaling transfer point (STP) in network 100 for determining a point code associated with signaling node 130. Alternatively, identifier field $302_K$ may include a point code associated with signaling node 130, which may be used by switching node 110 to directly identify signaling node 130.

Figure 4:
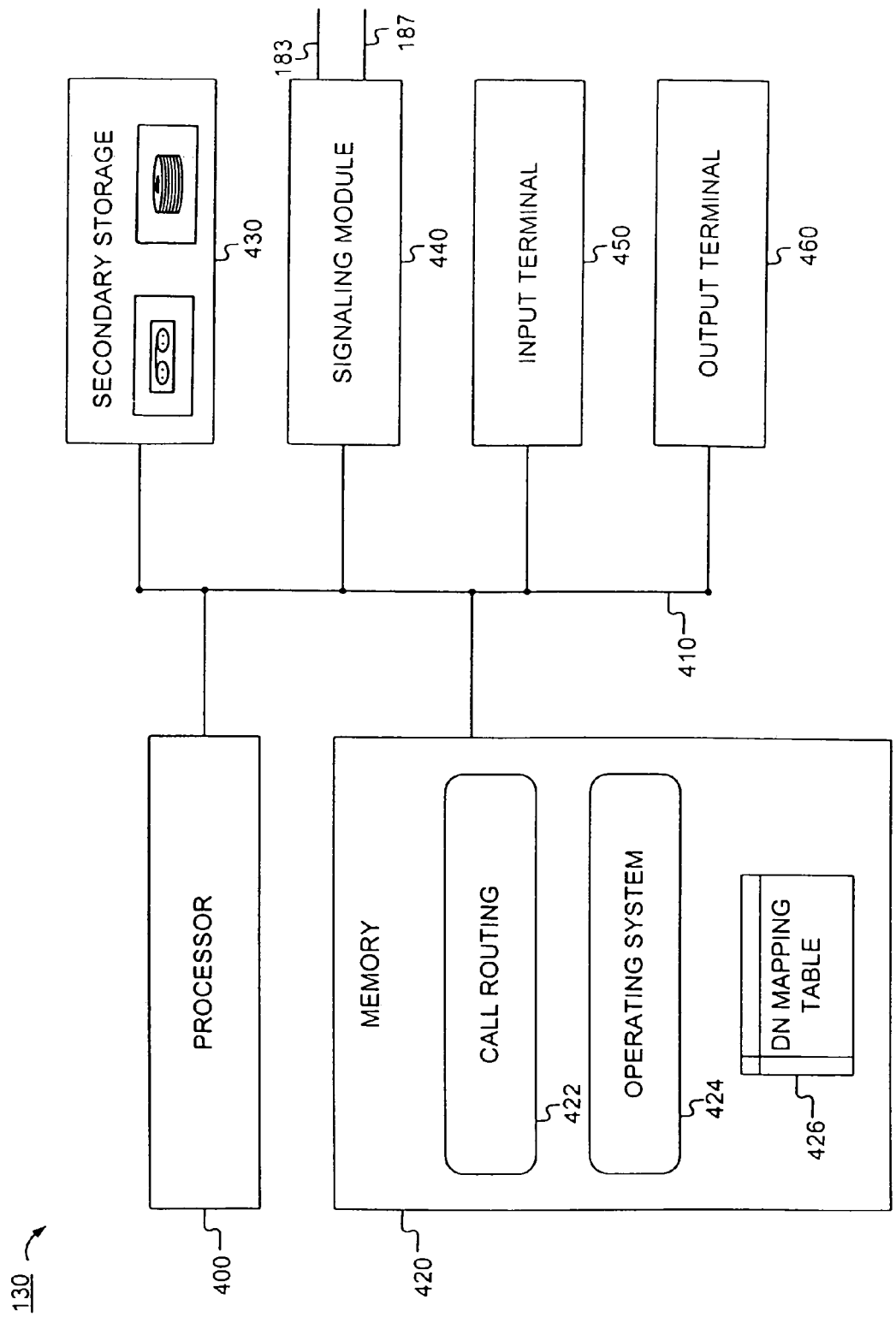
FIG. 4 is a block diagram of a signaling node in a telecommunications network, in accordance with methods and systems consistent with the invention.

FIG. 4 is a block diagram of signaling node 130, in accordance with methods and systems consistent with the invention. Signaling node 130 comprises a processor 400, which connects via a bus 410 to a memory 420, a secondary storage 430, a signaling interface module 440, an input terminal 450, and an output terminal 460.

Memory 420 includes a call routing module 422, an operating system 424, and a directory number (DN) mapping table 426. Call routing module 422 includes data and software executed by processor 400 for communicating with subscriber services database 140 via signaling network 170.

Secondary storage 430 includes a computer readable medium such as a disk drive and a tape drive. From the tape drive, software and data may be loaded onto the disk drive, which can then be copied into memory 420. Similarly, software and data in memory 420 may be copied onto the disk drive, which can then be loaded onto the tape drive.

Signaling interface module 440 transmits to and receives from switching node 110 and signaling network 170 signaling information such as, AIN messages. For example, signaling interface module 440 converts signaling information generated by call routing module 422 into AIN messages and transmits the messages to switching node 110 and signaling network 170. Likewise, signaling interface module 440 receives AIN messages from switching node 110 and signaling network 170 and converts the messages into an internal format for processing by call routing module 422.

Input terminal 450 may include an input device such as, a keyboard, and output terminal 460 may include a display device.

FIG. 5 is a block diagram of DN mapping table 426, in accordance with methods and systems consistent with the invention. DN mapping table 426 includes L entries $500_1$–$500_L$, where each entry includes an index field 501 and a directory number field 502. An index field 501 may include, for example, an event code and a subscriber group identifier, which identify an event and a subscriber group, respectively. A directory number field 502 includes a directory number that terminates at message node 150.

In one embodiment, an administrator may configure DN mapping table 426 such that each event code and subscriber group identifier combination is associated with a unique directory number. The administrator may select each event code and subscriber group identifier combination so that subscriber devices namely, telephone 111, TDD device 112, and desktop computer 114, each receives from message node 150 messages that can be processed by the subscriber devices.

Accordingly, when a subscriber dials a directory number and network 100 detects an event such as, an error in network 100 that must be reported to the subscriber, that event is reported in a TDD format to a subscriber using TDD device 112, whereas the same event is reported in a voice format to a subscriber using telephone 111. Similarly, events are reported in English to a subscriber whose subscriber group profile indicates that events should be reported in English, whereas the same events are reported in Spanish to a subscriber whose subscriber group profile indicates that events should be reported in Spanish.

As shown below in detail, the administrator may configure message node 150 with messages that are in a plurality of formats and languages and correspond to the directory numbers that appears in entries $500_1$–$500_L$ in DN mapping table 426. Thus, network 100 is configured to selectively report messages in different formats and languages, depending upon the particular subscriber group associated with a calling subscriber and the particular event detected by network 100.

Figure 6:
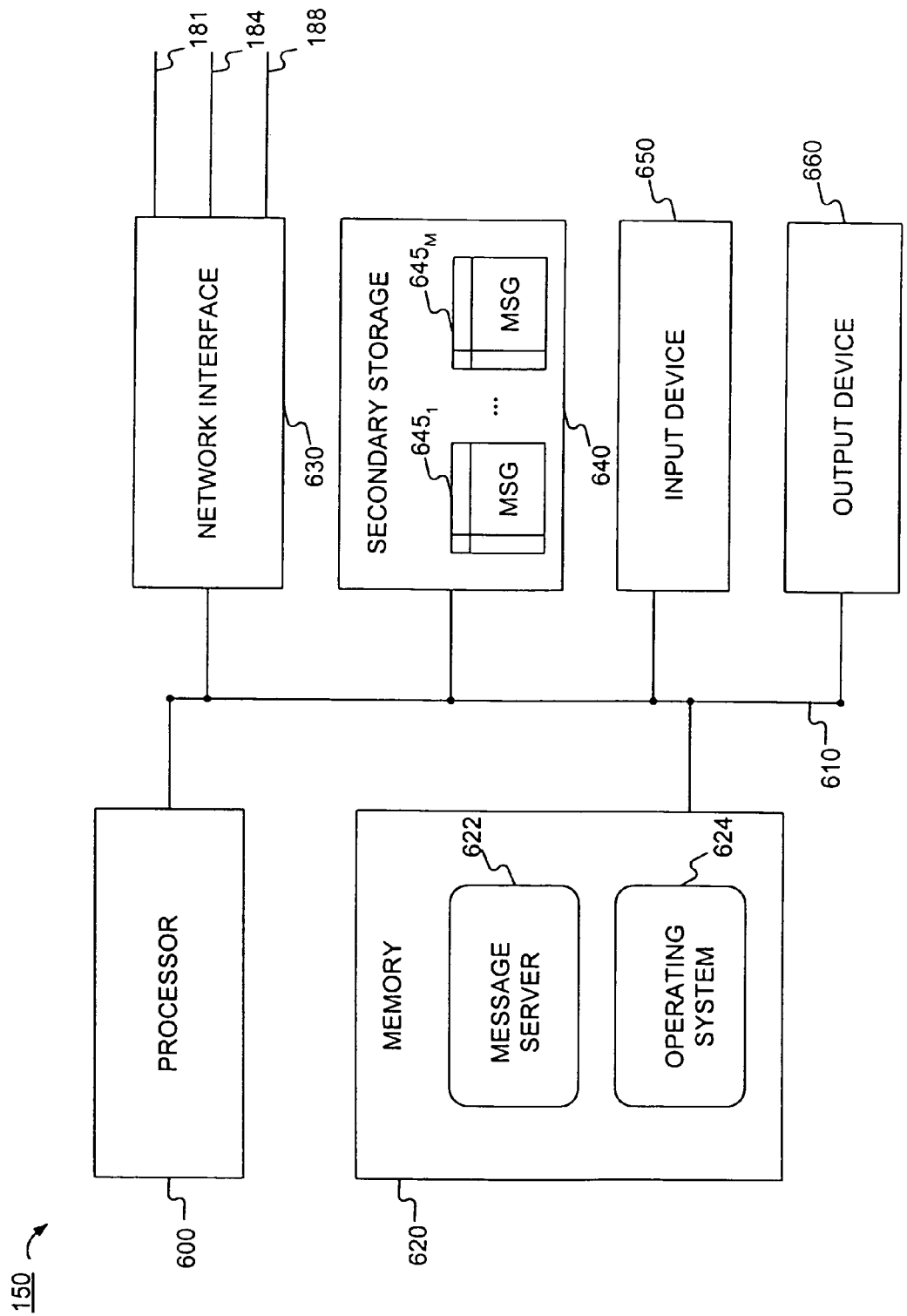
FIG. 6 is a block diagram of a message node in a telecommunications network, in accordance with methods and systems consistent with the invention.

FIG. 6 is a block diagram of message node 150, in accordance with methods and systems consistent with the invention. Message node 150 comprises a processor 600, which connects via bus 610 to a memory 620, a network interface module 630, a secondary storage 640, an input device 650, and an output device 660. Message node 150 may include a messaging system such as, Octel 250 manufactured by Lucent Technologies. Alternatively, message node 150 may include a computer that includes a VFX/PCI board manufactured by Dialogic, an Intel Company. Each port in the VFX/PCI board may be connected to a line in links 181, 184, and 188.

Memory 620 includes a message server 622 and an operating system 624. Message server 622 includes data and software executed by processor 600 for executing M messages $645_1$–$645_M$ stored in secondary storage 640. Operating system 624 includes data and software executed by processor 600 for managing tasks and processor interrupts.

In response to an interrupt initiated by network interface module 630, message server 622 loads into memory 620 one of messages $645_1$–$645_M$ that corresponds to the port on which a call is detected in network interface module 630. Alternatively, in an embodiment where links 181, 184, and 188 are provisioned as Direct Inward Dialing (DID) links, message server 622 loads into memory 620 one of messages $645_1$–$645_M$ that corresponds to a sequence of digits (e.g. a portion or all digits) of a directory number included in the detected call.

Message server 622 then executes or plays the message loaded into memory 620. After executing or playing the message, message server 622 signals network interface module 630 to terminate the call.

Secondary storage 640 stores messages $645_1$–$645_M$ in a plurality of formats such as, voice, data, TDD, and in a plurality of languages such as, English, Spanish, French, etc. An administrator stores messages $645_1$–$645_M$ in secondary storage 640 such that each message is associated with a unique port in network interface module 630.

Input device 650 may include an input device such as, a keyboard, and output device 660 may include a display device.

Figure 7:
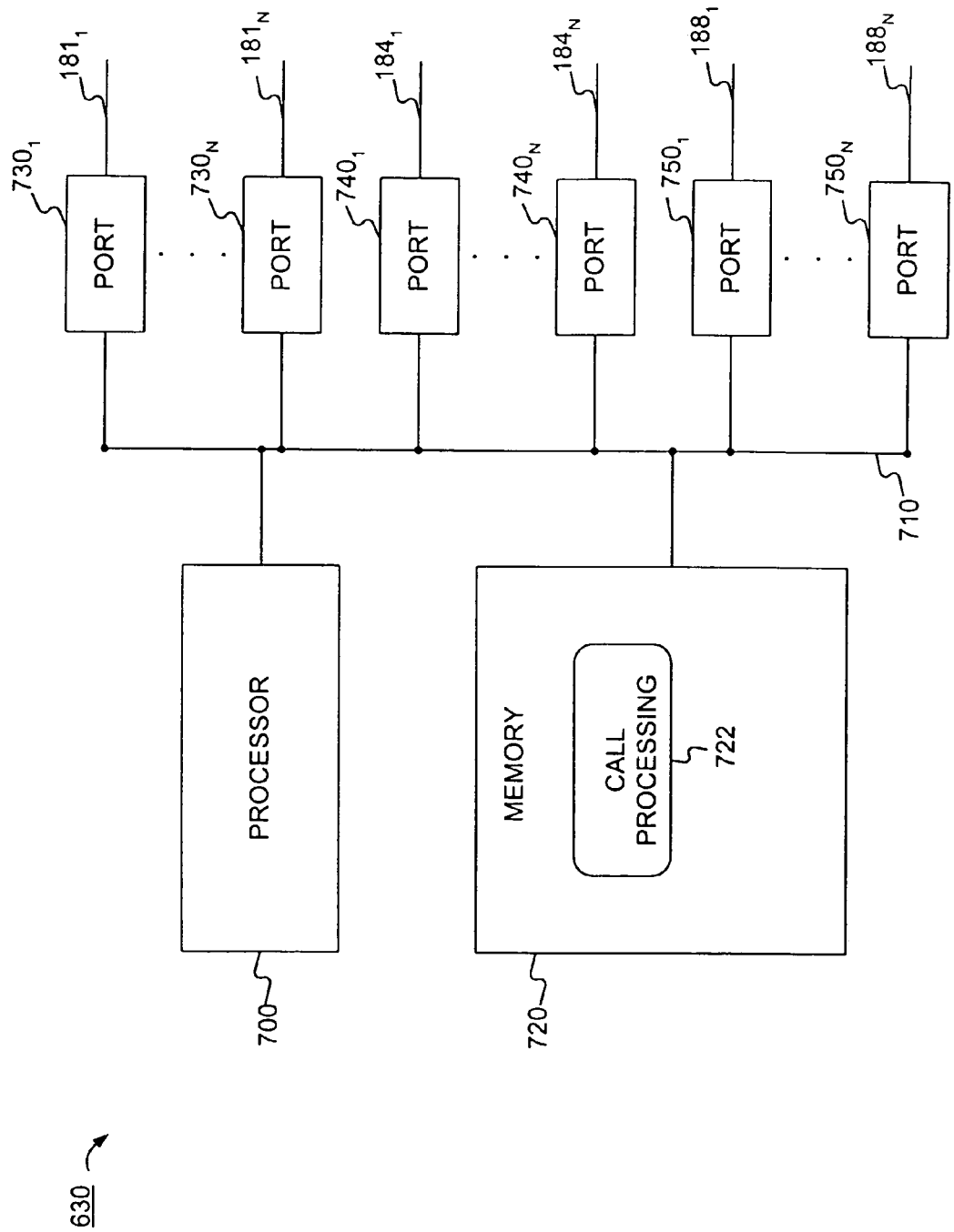
FIG. 7 is a block diagram of a network interface module in a message node, in accordance with methods and systems consistent with the invention.

Network interface module 630, which connects to links 181, 184, and 188, includes hardware and software for processing calls that arrive on links 181, 184, and 188. FIG. 7 is a block diagram of network interface module 630, in accordance with methods and systems consistent with the invention. Network interface module 630 includes a processor 700, which connects via bus 710 to a memory 720, 3×N ports $730_1$–$730_N$, $740_1$–$740_N$, and $750_1$–$750_N$. Ports $730_1$–$730_N$ connect to lines $181_1$–$181_N$, respectively; ports $740_1$–$740_N$ connect to lines $184_1$–$184_N$, respectively; and ports $750_1$–$750_N$ connect to lines $188_1$–$188_N$, respectively.

Alternatively, links 181, 184, and 188 may be provisioned as DID links such that calls detected at ports $730_1$–$730_N$, $740_1$–$740_N$, and $750_1$–$750_N$ include a portion (e.g., the last few digits) or all of the digits of the directory numbers associated with the calls.

Memory 720 includes a call processing module 722, which includes data and software executed by processor 700 for processing calls that arrive on lines $181_1$–$181_N$, $184_1$–$184_N$, and $188_1$–$188_N$. Call processing module 722 monitors ports $730_1$–$730_N$, $740_1$–$740_N$, and $750_1$–$750_N$, detects calls that arrive on lines $181_1$–$181_N$, $184_1$–$184_N$, and $188_1$–$188_N$, and transmits an off-hook signal to network 100 when a call is detected on any of the lines $181_1$–$181_N$, $184_1$–$184_N$, and $188_1$–$188_N$. When a call is detected, call processing module 722 initiates an interrupt in processor 600 to notify message server 622 as to the port on which a call is detected.

Figure 8:
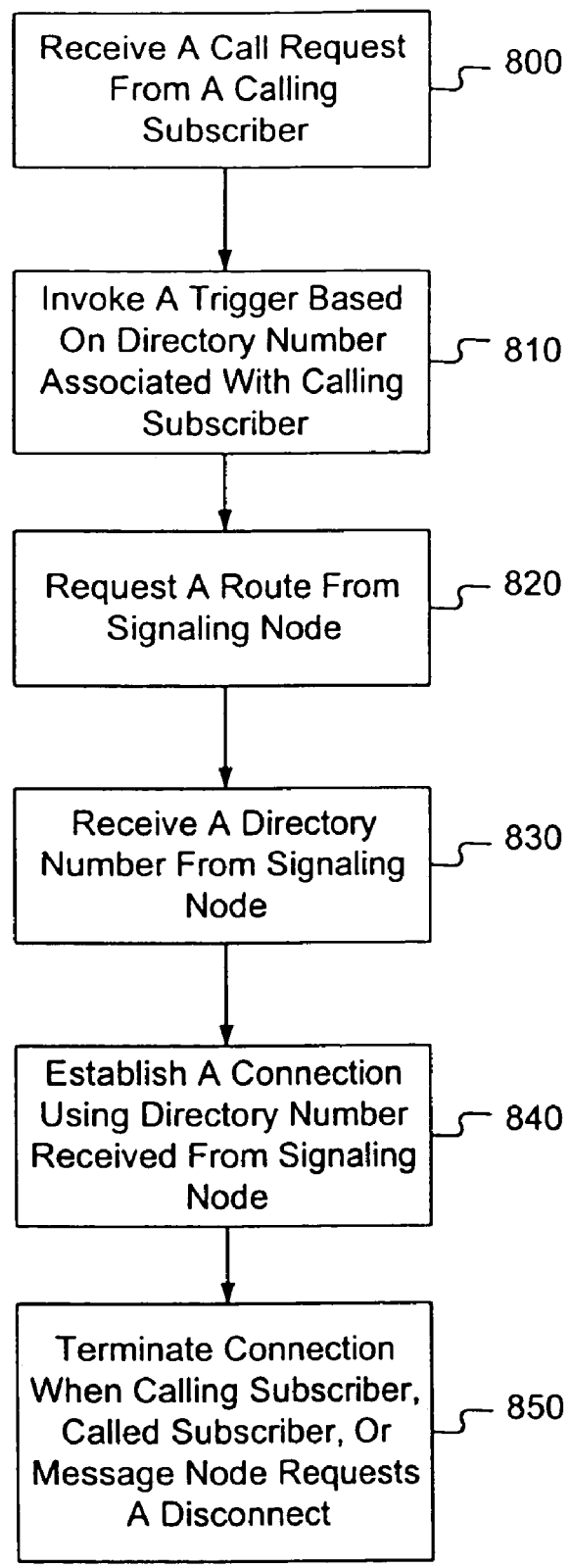
FIG. 8 is a flow chart of the steps performed by a call processing module in a switching node, in accordance with methods and systems consistent with the invention.

FIG. 8 is a flow chart of the steps performed by call processing module 222 in switching node 110, in accordance with methods and systems consistent with the invention. In one embodiment, a calling subscriber dials a directory number from, for example, telephone 111 (shown in FIG. 1) to a called subscriber that uses telephone 122. As a result, call processing module 222 receives a call request from telephone 111 (step 800). Call processing module 222 then invokes a trigger configured in trigger table 226 based on the directory number of the calling subscriber (step 810). For example, call processing module 222 invokes a trigger whose index matches a sequence of digits in the calling subscriber's directory number such as, the area code, a combination of the area code and office code, the calling subscriber's full directory number, or any other sequence of digits.

Once invoked, the trigger identifies a signaling node, for example signaling node 130, for routing the calling subscriber's call. Accordingly, call processing module 222 requests a route from signaling node 130 by sending, for example, an AIN info_analyze message whose parameters include the called subscriber's directory number and the calling subscriber's directory number (step 820). Call processing module 222 then suspends further processing of the call until it receives a response from signaling node 130 (step 830).

The response from signaling node 130 may include, for example, an AIN info_analyze_response message that includes as one of its parameters a directory number to which call processing module 222 must route the call. If signaling node 130 detects an event that must be reported to the calling subscriber such as, when the called subscriber's directory number is out of service, network 100 lines are busy, or a segment of network 100 is down, signaling node 130 returns in the info_analyze_response message a directory number that terminates at message node 150. Otherwise, signaling node 130 returns the directory number of the next node in network 100 that must process the call request in order to establish the call between calling subscriber telephone 111 and called subscriber telephone 121.

Call processing module 222 then establishes a call using the directory number received from signaling node 130 (step 840). If the directory number terminates at message node 150, message node 150 answers the call and executes or plays a message associated with that directory number. Finally, call processing module 222 terminates the call when the calling subscriber telephone 111 or message node 150 requests a disconnect (step 850).

Figure 9:
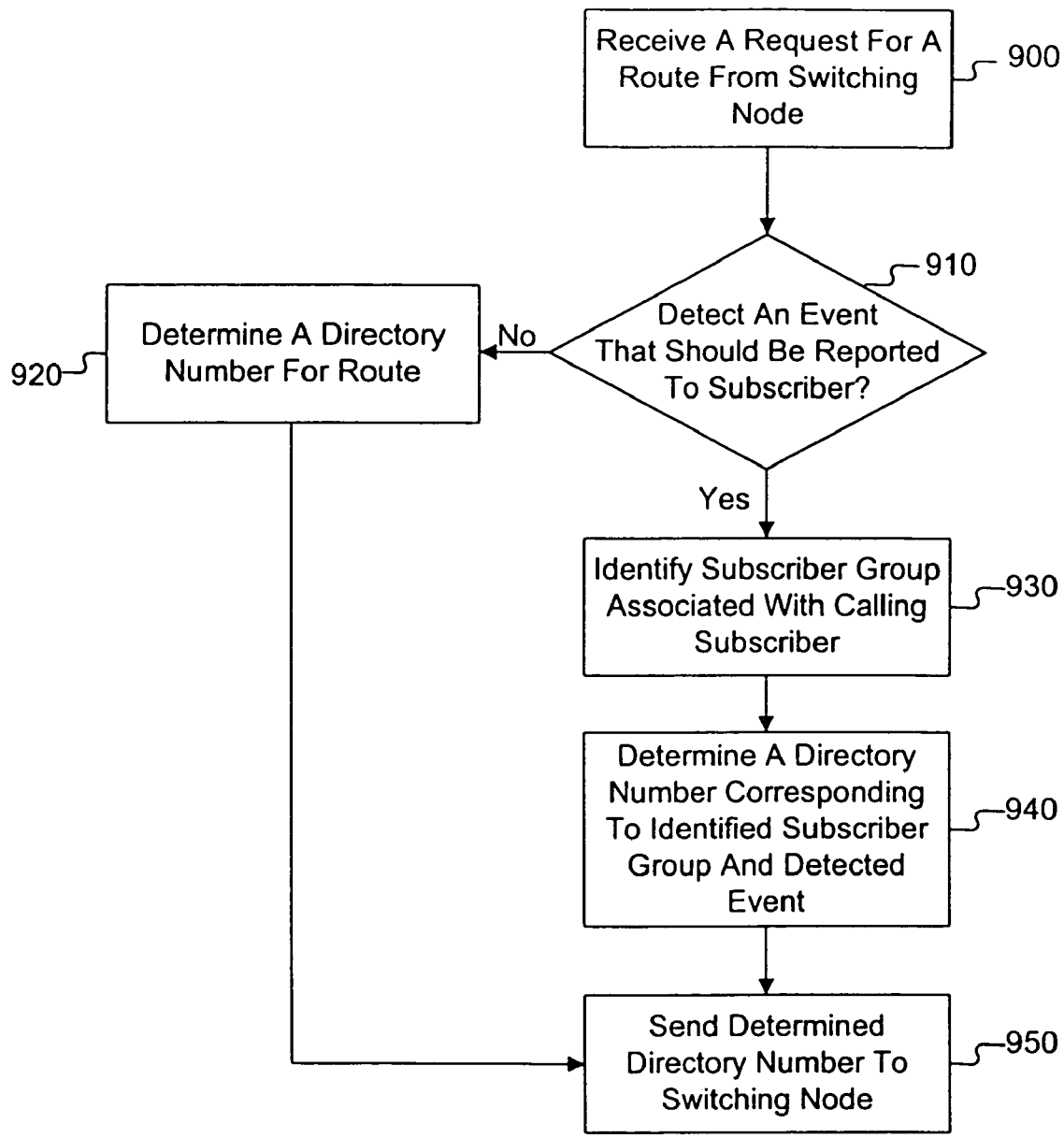
FIG. 9 is a flow chart of the steps performed by a call routing module in a signaling node, in accordance with methods and systems consistent with the invention.
Figure 10:
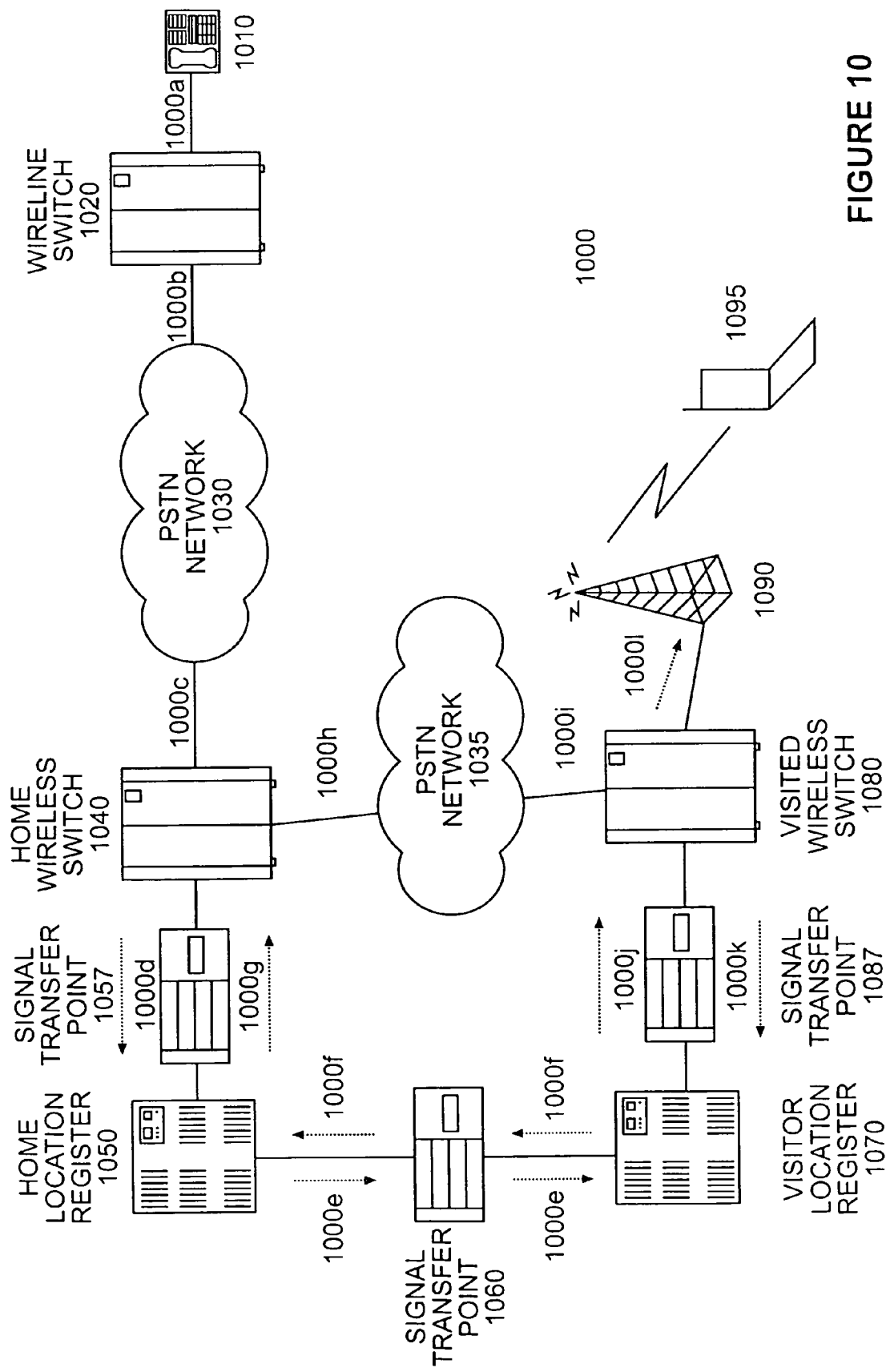
FIG. 10 is a block diagram of a conventional wireless telecommunications network implementing the LocationRequest, and RoutingRequest messages.
Figure 11:
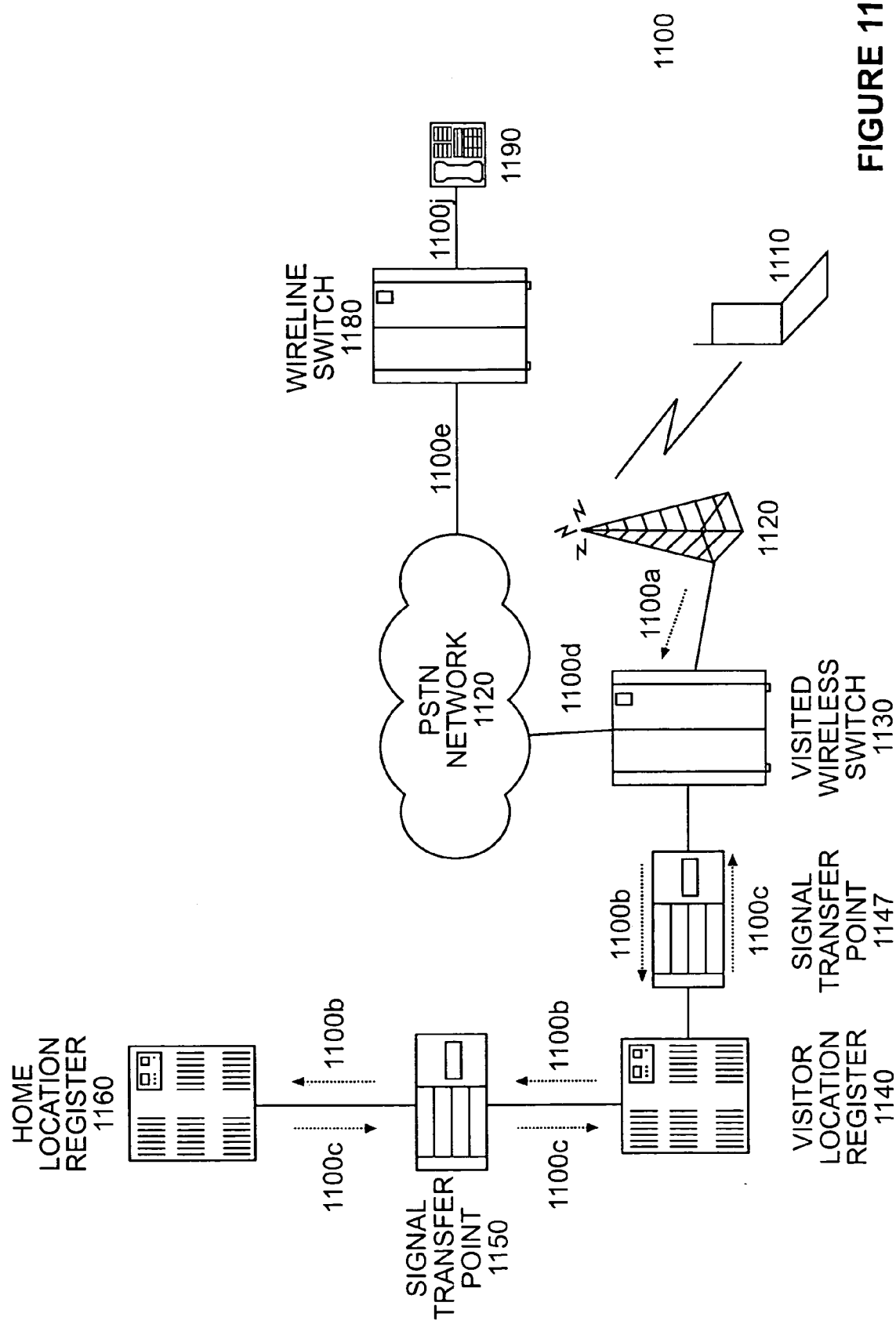
FIG. 11 is a block diagram of a conventional wireless telecommunications network implementing the OriginationRequest message.
Figure 12:
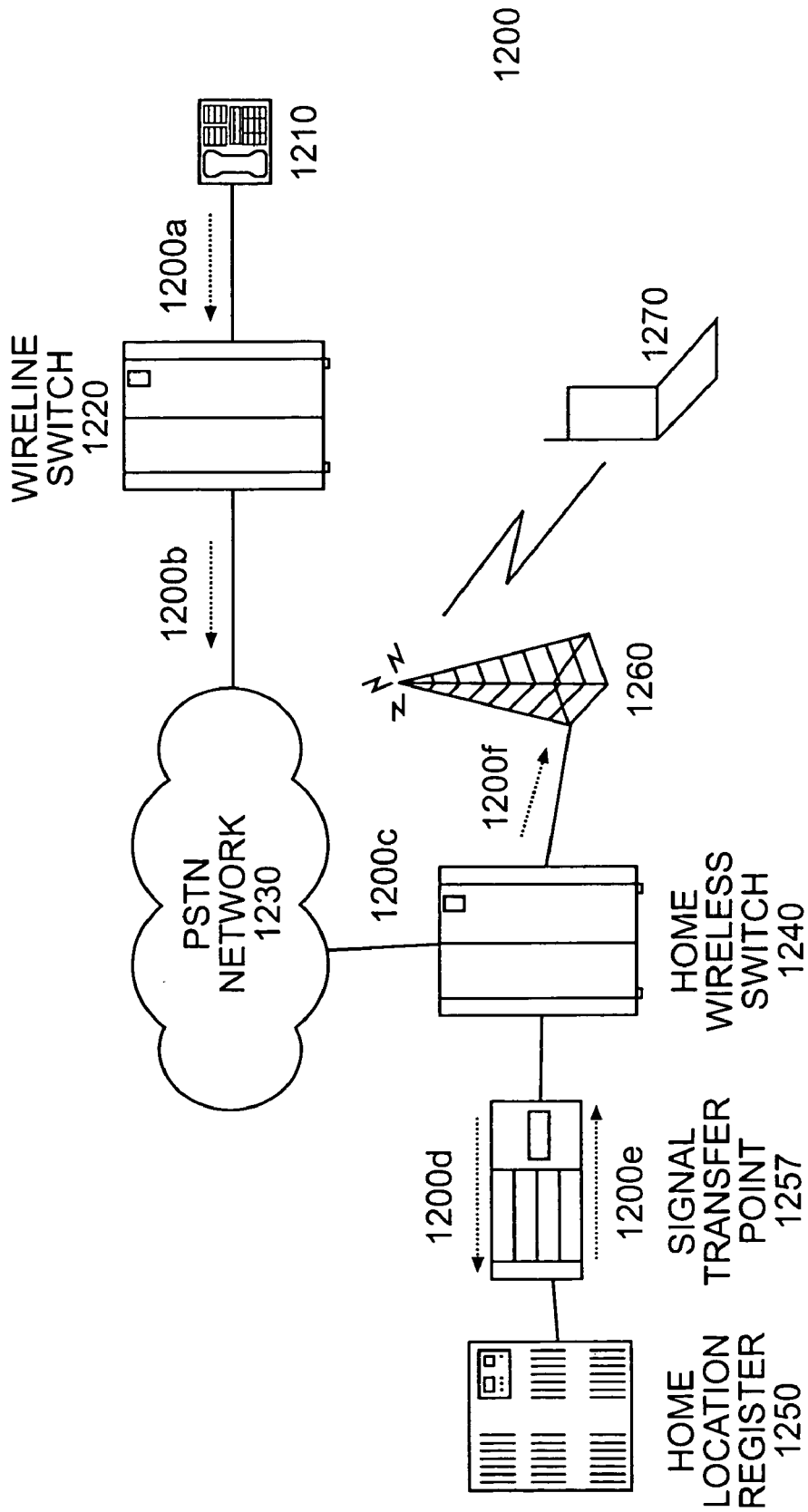
FIG. 12 is a block diagram of a conventional wireless telecommunications network implementing the TerminationRequest message.

FIG. 9 is a flow chart of the steps performed by a call routing module 422 in signaling node 130, in accordance with methods and systems consistent with the invention. When the calling subscriber dials a directory number from telephone 111 to the called subscriber at telephone 122, call routing module 422 receives from switching node 110 a request for a route from the calling subscriber to the called subscriber (step 900). For example, call routing module 422 may receive an AIN info_analyze message whose parameters include the called subscriber's directory number and the calling subscriber's directory number.

While processing the request, call routing module 422 determines whether network 100 can establish the call (step 910). If call routing module 422 determines that network 100 can establish the call, call routing module 422 determines the directory number of the next node in network 100 that must process the call (step 920). Call routing module 422 then sends to switching node 110 the determined directory number in an AIN info_analyze_response message (step 950).

If call routing module 422 determines that network 100 cannot establish the call or detects an event that must be reported to the calling subscriber such as, when the called subscriber's directory number is out of service or network 100 links are busy, call routing module 422 determines the event code associated with that event. Call routing module 422 then queries subscriber service database 140, which may include, for example, a LIDB database, to determine the subscriber group identifier associated with the calling subscriber (step 930).

After determining the subscriber group identifier of the calling subscriber, call routing module 422 selects from DN mapping table 426 an entry whose index field 501 matches, for example, the event code and the subscriber group identifier (step 940). Call routing module 422 then reads the directory number in the directory number field 502 of the selected entry and sends the directory number to switching node 110 in an AIN info_analyze_response message (step 950). Accordingly, by selecting from DN mapping table 426 a predetermined directory number that terminates at message node 150 and that is based on the subscriber group identifier of the calling subscriber and the event code associated with the detected event, signaling node 130 has identified an appropriate message in message node 150 for reporting the detected event to the calling subscriber.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

Alternate Embodiment

The event reporting techniques described above relates to wireline telecommunication networks. Methods and system consistent with one embodiment of the invention may include event reporting used in wireless telecommunication networks.

The following description of these alternate embodiment of this invention refers to the accompanying drawings. Where appropriate, the same reference numbers in different drawings refer to the same or similar elements.

In accordance with an alternate embodiment of the invention, a network is configured such that network events are reported to wireless subscribers, in a plurality of formats and languages depending upon the particular subscriber group to which the wireless subscriber belongs. When a wireless switching node in the network receives a call request from a wireless subscriber, via a wireline switching node, a trigger in the wireless switching node is invoked to identify a designated location register for routing the call. The wireless switching node then sends an origination request to the location register. If during processing of the origination request, the location register detects an event that should be reported to the wireless subscriber, the location register identifies the subscriber group associated with the wireless subscriber. The location register then selects from a directory mapping table a directory number associated with the identified subscriber group and the detected event and returns the selected directory number to the wireless switching node. Wireless switching node then establishes the call to the message node, where a message associated with the determined directory number is executed.

In accordance with another embodiment of the invention, a network is configured such that network events are reported to entities attempting to communicate with wireless subscribers, in a plurality of formats and languages depending upon the particular subscriber group to which the wireless subscriber belongs. When a wireline switching node in the network receives a call request from an entity attempting to communicate with a wireless subscriber, a trigger in the wireline switching node is invoked to identify a designated location register for routing the call. The wireline switching node then sends a termination request to the location register. If during processing of the request the location register detects an event that should be reported to the entity attempting to communicate with the wireless subscriber, the location register identifies the subscriber group associated with the wireless subscriber. The location register then selects from a directory mapping table a directory number associated with the identified subscriber group and the detected event and returns the selected directory number to the wireline switching node. Wireline switching node then establishes the call to the message node, where a message associated with the determined directory number is executed. The utility of this process recognizes that if the wireless subscriber utilizes a special data type, such as TDD for communication, then those who would wish to communicate with the wireless subscriber will also be expecting this same format.

Figure 13:
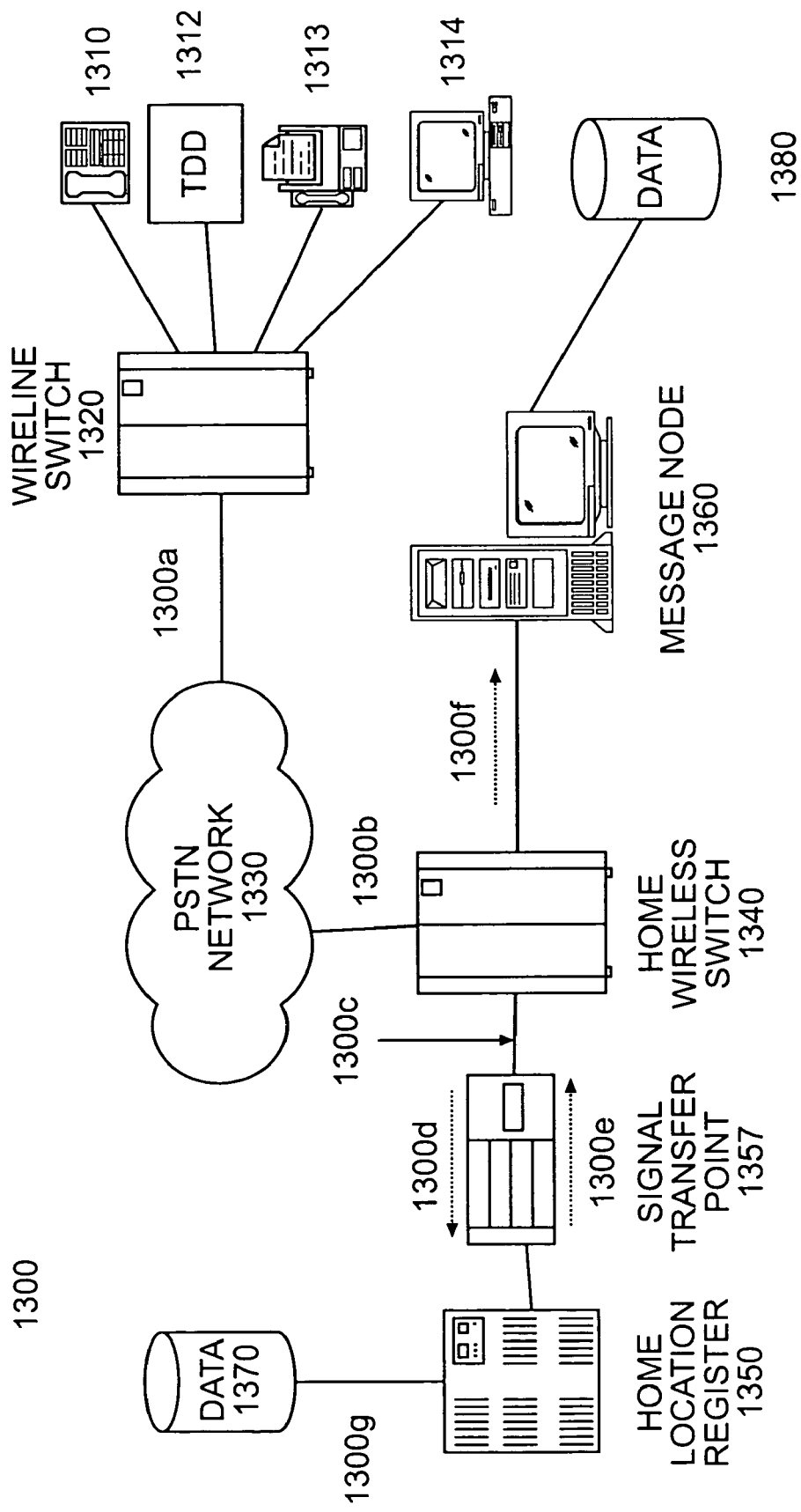
FIG. 13 is a block diagram of a wireless telecommunications network, in accordance with an alternate embodiment consistent with the invention.

FIG. 13 shows a block diagram of a telecommunications network 1300, in accordance with methods and systems consistent with one embodiment of the invention. As shown, network 1300 comprises wireline switching node 1320, switching network 1330, wireless switching node 1340, home location register (HLR) 1350, signal transfer point (STP) 1357, message node 1360, message database 1380 and subscriber services database 1370. Wireline switching node 1320 connects to switching network 1330 via link 1300a. Wireline switching node 1320 also connects via local loops to a wireline telephone 1310, telecommunications for the deaf (TDD) device 1312, facsimile machine 1313 and a desktop computer 1314.

Wireline switching node 1320 may include, for example, a 5ESS™, DMS-100™ (or DMS-200™), GTD-5™, or an EWSD™ switching system manufactured by Lucent Technologies, Inc., Nortel Networks Corporation, AGCS, and Siemens, respectively.

Wireless switching node 1340 connects to switching network 1330, HLR 1350 and message node 1360 via links 1300b, 1300c and 1300f respectively. HLR 1350 further connects to subscriber services database 1370 via link 1300g.

Wireless switching node 1340 may include, for example, a 5ESS™ or DMS-MTX™ switching system manufactured by Lucent Technologies, Inc. or Nortel Networks Corporation, respectively.

Signal Transfer Point 1357 routes signaling messages, such as Advanced Intelligent Network (AIN) IS-41, in telecommunications network 1300. It should be noted that STP 1357 may represent one or more STPs that are required to perform the transfer of messages. Furthermore, the communications between home wireless switch 1340 and HLR 1350, may take place directly without STP 1357.

Home location register 1350 stores information about wireless subscribers in telecommunications network 1300 such as, the current location of a wireless device associated with a subscriber, billing information, and services that the wireless subscriber is authorized to use.

Message node 1360 may include, for example, a messaging system, which includes messages in a plurality of formats such as, voice, data, and TDD, and in a plurality of languages such as, English, Spanish, French, etc. Alternatively, message node 1360 may be a workstation, which includes a plurality of stored messages housed in message database 1380 and a bank of modems for receiving calls from wireless switching node 1340.

Subscriber services database 1370 stores information about subscriber services and may include, for example, a line information database (LIDB), call management services database (CMSDB), and/or business services database (BSDB). The LIDB, CMSDB, and BSDB are defined in Bellcore (now Telcordia Technologies, Inc.) publication TR-NWT-001244, "Supplemental Service Control Point (SCP)."

Switching network 1330 may include, for example, a Public Switched Telephone Network/Interchange Carrier (PSTN/IX).

Call processing in telecommunications network 1300 will be explained in detail below with reference to FIG. 20.

Figure 14:
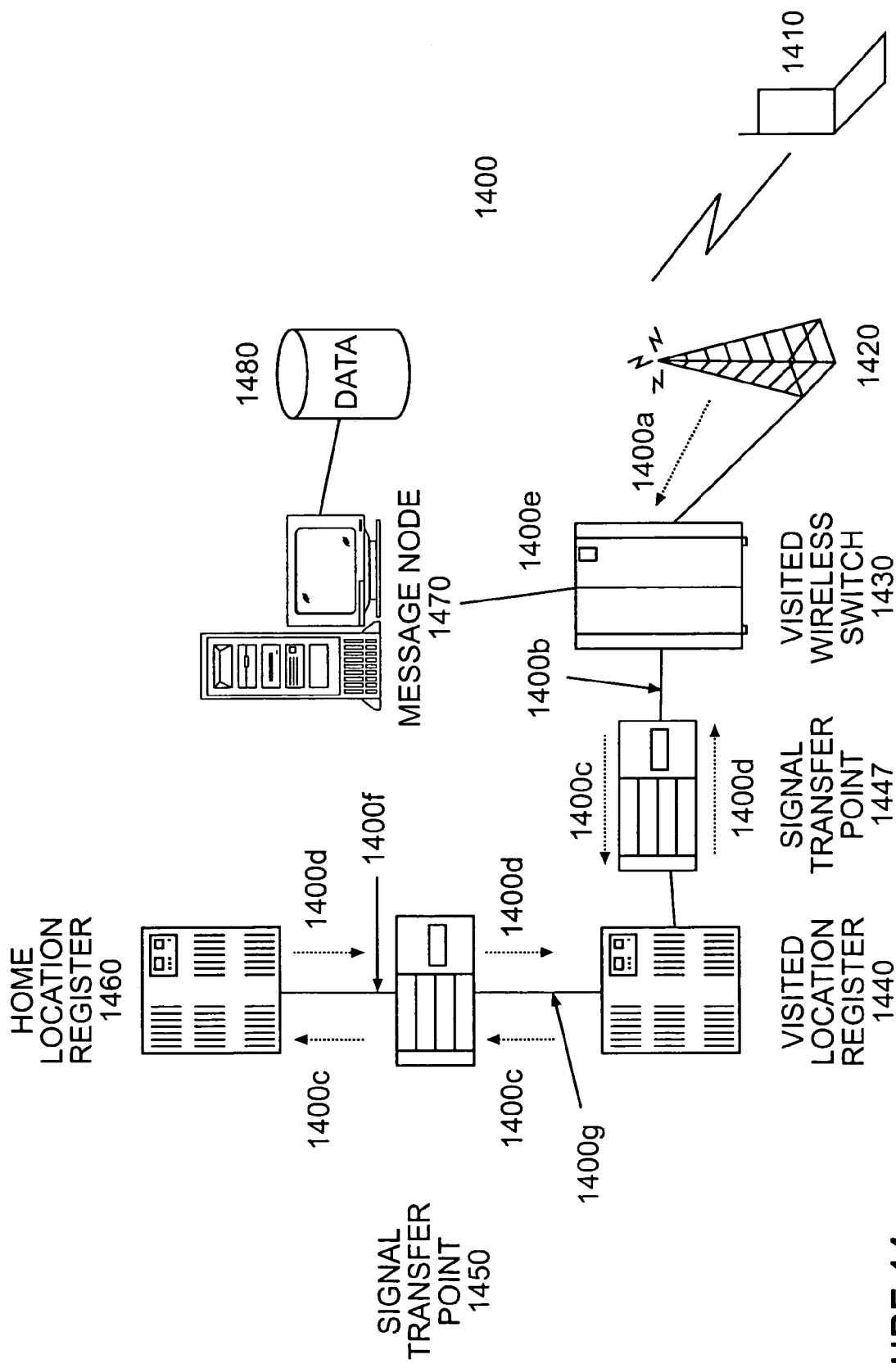
FIGS. 14 and 14A are block diagrams of a wireless telecommunications network, in accordance with alternate embodiments, consistent with the invention.

FIG. 14 shows a block diagram of a telecommunications network 1400, in accordance with methods and systems consistent with one embodiment of the invention. As shown, network 1400 comprises wireless device 1410, antenna 1420, visited wireless switching node 1430, visited location register (VLR) 1440, signal transfer points (STPs) 1447 and 1450, home location register (HLR) 1460, message node 1470 and subscriber services database 1480.

Wireless device 1410 may be interfaced with special format communication devices such as a telecommunications for the deaf (TDD) device or a laptop computer.

Wireless switching node 1430 connects to VLR 1440 and message node 1470 via links 1400b and 1400e respectively. Visited location register 1440 connects with STP 1450 via link 1400g. STP 1450 further connects with home location register 1460 via link 1400f. Message node 1470 connects to subscriber services database 1480.

Wireless switching node 1430 may include, for example, a 5ESS™ or DMS-MTX™ switching system manufactured by Lucent Technologies, Inc. or Nortel Networks Corporation, respectively.

Home location register 1460 stores information about wireless subscribers in telecommunications network 1400 such as, the current location of a wireless device associated with a subscriber, billing information, and services that the wireless subscriber is authorized to use. Visitor location register 1440 stores information about the current location of wireless device 1410 when the wireless device is activated outside of its home area.

Signal Transfer Points 1447 and 1450, route signaling messages, such as Advanced Intelligent Network (AIN) IS-41, in telecommunications network 1400. It should be noted that STPs 1447 and 1450 may represent one or more STPs that are required to perform the transfer of messages. Furthermore, the communications between visited wireless switch 1430 and VLR 1440, and between VLR 1440 and HLR 1460, may take place directly without STPs 1447 and1250, respectively.

Message node 1470 may include, for example, a messaging system, which includes messages in a plurality of formats such as, voice, data, and TDD, and in a plurality of languages such as, English, Spanish, French, etc. Alternatively, message node 1470 may be a workstation, which includes a plurality of stored messages and a bank of modems for receiving calls from wireless switching node 1430.

Subscriber services database 1480 stores information about subscriber services and may include, for example, a line information database (LIDB), call management services database (CMSDB), and/or business services database (BSDB). The LIDB, CMSDB, and BSDB are defined in Bellcore (now Telcordia Technologies, Inc.) publication TR-NWT-001244, "Supplemental Service Control Point (SCP)."

Call processing in telecommunications network 1400 will be explained in detail below with reference to FIG. 21.

Figure 14A:
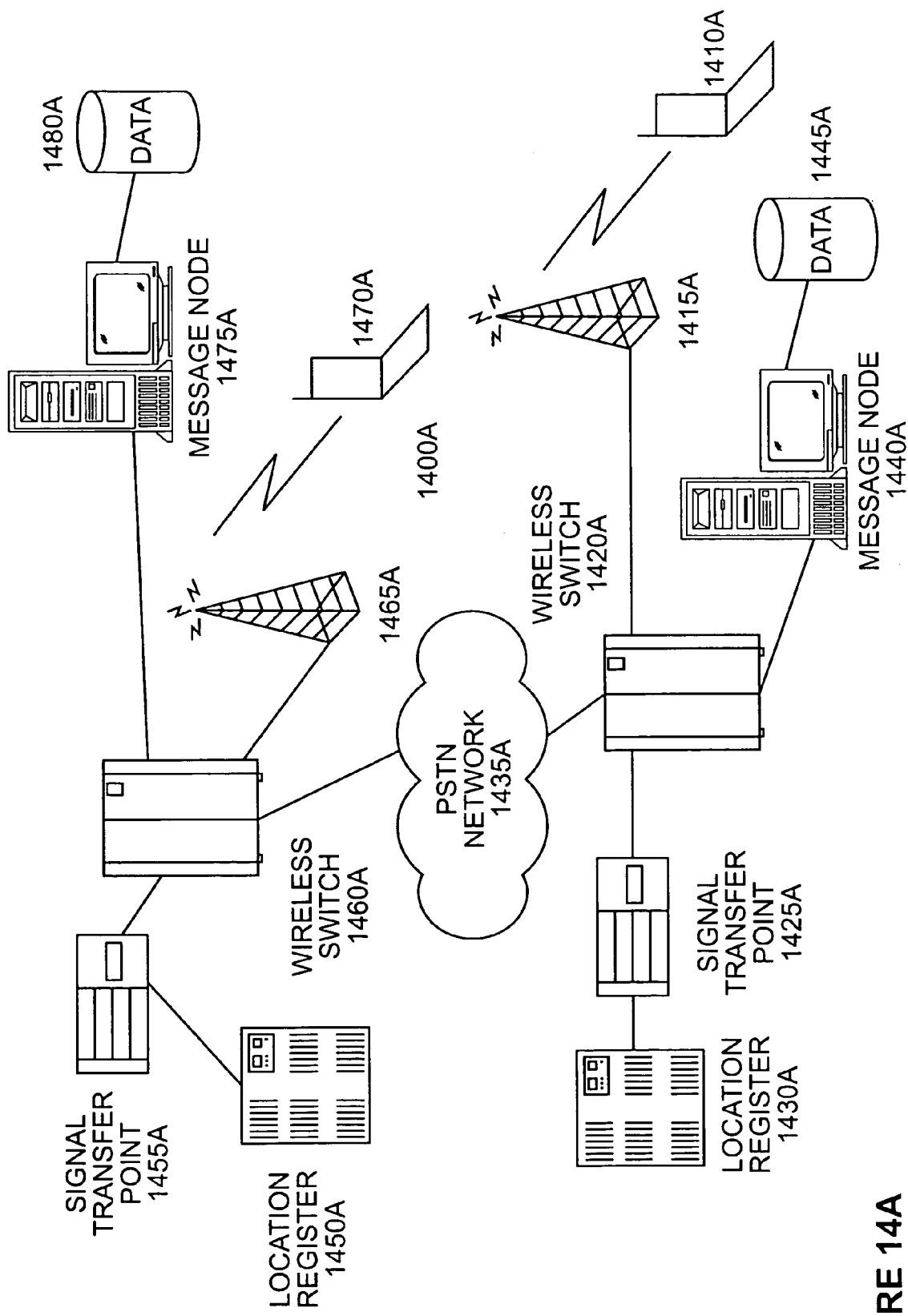

FIG. 14A shows a block diagram of a telecommunications network 1400A, in accordance with methods and systems consistent with one embodiment of the invention. As shown, network 1400A comprises wireless devices 1410A and 1470A, antennae 1415A and 1465A, wireless switching nodes 1420A and 1460A, location registers 1430A and 1450A, signal transfer points (STPs) 1425A and 1455A, PSTN 1435A, message nodes 1440A and 1475A and subscriber services databases 1445A and 1480A.

Wireless devices 1410A and 1470A may be interfaced with special format communication devices such as a telecommunications for the deaf (TDD) device or a laptop computer.

Wireless switching nodes 1420A and 1460A connect to a respective location register 1430A and 1450A, via STPs 1425A and 1455A, respectively. Wireless switching nodes 1420A and 1460A also connect with PSTN 1435A. Wireless switching nodes 1420A and 1460A further connect to message nodes 1440A and 1475A, respectively.

Wireless switching nodes 1420A and 1460A may include, for example, a 5ESS™ or DMS-MTX™ switching system manufactured by Lucent Technologies, Inc. or Nortel Networks Corporation, respectively.

Location registers 1430A and 1450A stores information about wireless subscribers in telecommunications network 1400A such as, the current location of a wireless device associated with a subscriber, billing information, and services that the wireless subscriber is authorized to use.

Signal Transfer Points 1425A and 1455A route signaling messages, such as Advanced Intelligent Network (AIN) IS-41, in telecommunications network 1400A. It should be noted that STPs 1425A and 1455A may represent one or more STPs that are required to perform the transfer of messages. Furthermore, the communications between wireless switches 1420A, 1460A and location registers 1430A, 1450A, may take place directly without STPs 1425A and1455A, respectively.

Message nodes 1440A and 1475A may include, for example, a messaging system, which includes messages in a plurality of formats such as, voice, data, and TDD, and in a plurality of languages such as, English, Spanish, French, etc. Alternatively, message nodes 1440A and 1475A may be a workstation, which includes a plurality of stored messages and a bank of modems for receiving calls from wireless switching nodes 1420A and 1460A, respectively.

Subscriber services databases 1445A and 1480A store information about subscriber services and may include, for example, a line information database (LIDB), call management services database (CMSDB), and/or business services database (BSDB). The LIDB, CMSDB, and BSDB are defined in Bellcore (now Telcordia Technologies, Inc.) publication TR-NWT- 001244, "Supplemental Service Control Point (SCP)."

Call processing in telecommunications network 1400A will be explained in detail below with reference to FIG. 23.

FIG. 15 is a block diagram of wireless switching nodes 1340 and 1430, in accordance with methods and systems consistent with the invention. Wireless switching node 1340 will be described, but it should be understood that wireless switching node 1430 comprises similar elements and functions, other than being a visited wireless switching node connected to different entities in network 1400. Wireless switching node 1340 comprises a processor 1500, which connects via bus 1510 to a memory 1520, a secondary storage 1530, a peripheral module 1540, a signaling module 1550, and input terminal 1560, and an output terminal 1570.

Memory 1520 includes a call processing module 1522, an operating system 1524, and a trigger table 1526. Call processing module 1522 includes data and software executed by processor 1500 for establishing, maintaining, and terminating calls between wireless subscribers in the telecommunications network. Operating system 1524 includes data and software executed by processor 1500 for non-switching functions, which include, for example, task scheduling and processor interrupt handling. Trigger table 1526 includes entries that are used to intercept call requests in wireless switching node and to identify the associated location register.

Secondary storage 1530 includes a computer readable medium such as a disk drive and a tape drive. From the tape drive, software and data may be loaded onto the disk drive, which can then be copied into memory 1520. Similarly, software and data in memory 1520 may be copied onto the disk drive, which can then be loaded onto the tape drive.

Peripheral interface module 1540 interfaces with the message node and PSTN/IX 1330.

Signaling interface module 1550 transmits to and receives from location register 1350 signaling information such as, Advanced Intelligent Network (AIN) messages. For example, signaling interface module 1550 converts signaling information generated by call processing module 1522 into AIN messages and transmits the messages to location register 1350. For network 1300, these messages include TerminationRequest messages. Likewise, signaling interface module 1550 receives AIN messages from location register 1350 and converts the messages into an internal format for processing by call processing module 1522.

Input terminal 1560 may include an input device such as, a keyboard, and output terminal 1570 may include a display device.

Figure 16:
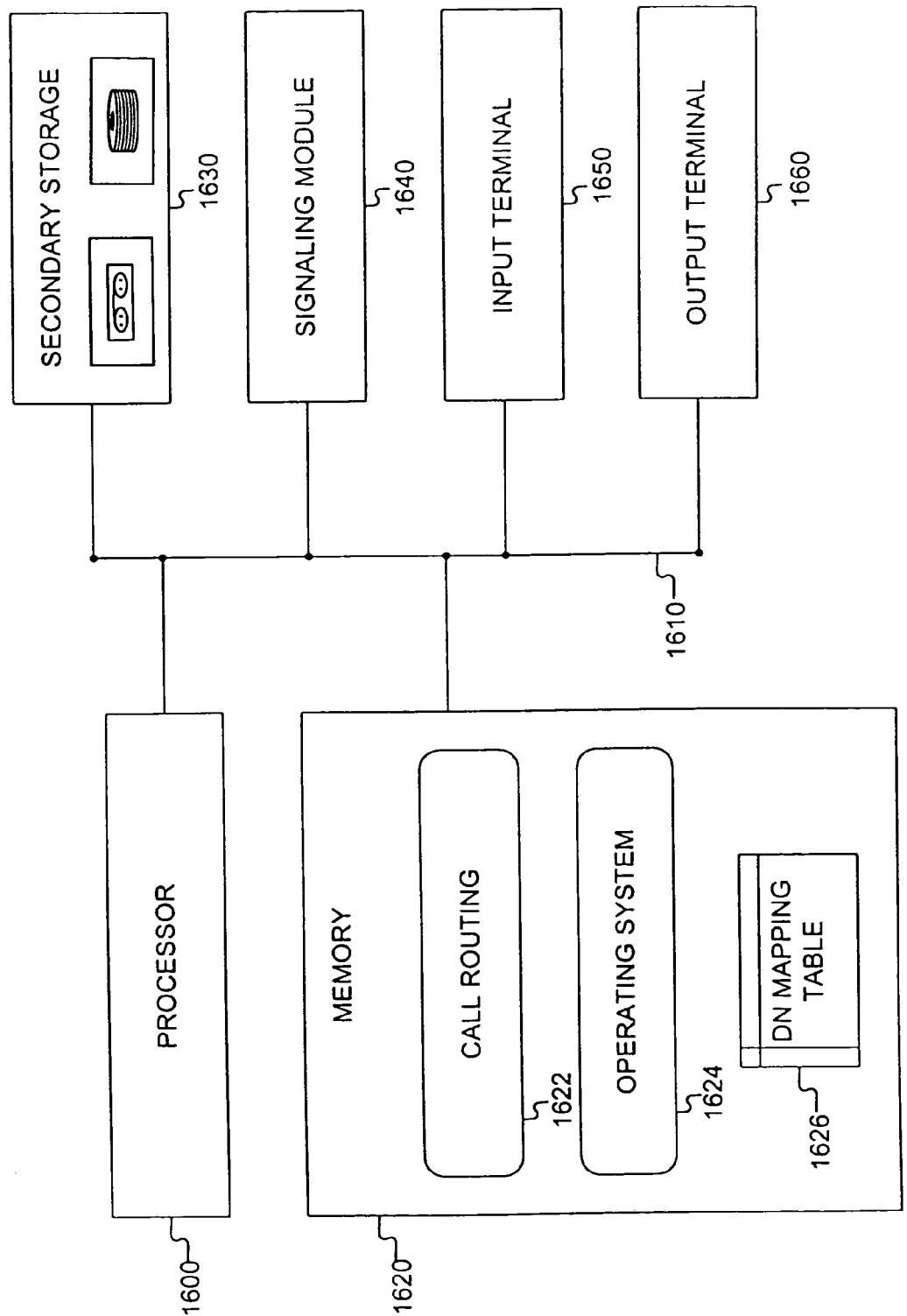
FIG. 16 is a block diagram of a home location register in a wireless telecommunication network, in accordance with methods and systems consistent with the invention.

FIG. 16 is a block diagram of home location register (HLR) 1350 or 1460, in accordance with methods and systems consistent with the invention. HLR 1350 will be described, however it should be understood that HLR 1460 comprises of similar elements and functions. Home location register 1350 comprises a processor 1600, which connects via a bus 1610 to a memory 1620, a secondary storage 1630, a signaling interface module 1640, an input terminal 1650, and an output terminal 1660.

Memory 1620 includes a call routing module 1622, an operating system 1624, and a directory number (DN) mapping table 1626. Call routing module 1622 includes data and software executed by processor 1600 for communicating with subscriber services database 1370.

Secondary storage 1630 includes a computer readable medium such as a disk drive and a tape drive. From the tape drive, software and data may be loaded onto the disk drive, which can then be copied into memory 1620. Similarly, software and data in memory 1370 may be copied onto the disk drive, which can then be loaded onto the tape drive.

Signaling interface module 1640 transmits to and receives from wireless switching node 1340 signaling information such as, AIN messages. For example, signaling interface module 1640 converts signaling information generated by call routing module 1622 into AIN messages and transmits the messages to wireless switching node 1340. Likewise, signaling interface module 1640 receives AIN messages from wireless switching node 1340 and converts the messages into an internal format for processing by call routing module 1622.

With respect to network 1400, HLR 1460's signaling interface module 1640 transmits and receives from VLR 1440, via STP 1450, signaling information such as, AIN messages. For example, signaling interface module 1640 converts signaling information generated by call routing module 1622 into AIN messages and transmits the messages to STP 1450 for passage to VLR 1440. Likewise, signaling interface module 1640 receives AIN messages from STP 1450 and converts the messages into an internal format for processing by call routing module 1622.

Input terminal 1650 may include an input device such as, a keyboard, and output terminal 1660 may include a display device.

FIG. 17 is a block diagram of DN mapping table 1626, in accordance with methods and systems consistent with the invention. DN mapping table 1626 includes L entries $1700_1$–$1700_L$, where each entry includes an index field 1701 and a directory number field 1702. An index field 1701 may include, for example, an event code and a subscriber group identifier, which identify an event and a subscriber group, respectively. A directory number field 1702 includes a directory number that terminates at message node 1360.

In one embodiment, an administrator may configure DN mapping table 1626 such that each event code and subscriber group identifier combination is associated with a unique directory number. The administrator may select each event code and subscriber group identifier combination so that user devices namely, telephone 1310, TDD device 1312, and desktop computer 1314, each receives from message node 1360 messages that can be processed by the user devices.

Accordingly, when a user attempting to contact a wireless subscriber dials a directory number and network 1300 detects an event such as, an error in network 1300 that must be reported to the user, that event is reported in a TDD format to a user attempting to communicate with a wireless subscriber using a wireless device interfaced with a TDD device, whereas the same event is reported in a voice format to a user attempting to communicate with a wireless subscriber using voice formats. Similarly, events are reported in English to a user attempting to communicate with a wireless subscriber whose subscriber group profile indicates that events should be reported in English, whereas the same events are reported in Spanish to a user attempting to communicate with a wireless subscriber whose subscriber group profile indicates that events should be reported in Spanish.

In another embodiment, an administrator may configure DN mapping table 1626 such that each event code and subscriber group identifier combination is associated with a unique directory number. With reference to FIG. 14, the administrator may select each event code and subscriber group identifier combination so that subscriber device namely, wireless device 1410, receives from message node 1470 messages that can be processed by the user devices.

Accordingly, for wireless subscriber applications as described in FIG. 14, when a wireless subscriber dials a directory number and network 1400 detects an event such as, an error in network 1400 that must be reported to the wireless subscriber, that event is reported in a TDD format to a subscriber using TDD a device, whereas the same event is reported in a voice format to a wireless subscriber using voice formats. Similarly, events are reported in English to a wireless subscriber whose subscriber group profile indicates that events should be reported in English, whereas the same events are reported in Spanish to a wireless subscriber whose subscriber group profile indicates that events should be reported in Spanish.

As shown below in detail, the administrator may configure message nodes 1360 and 1470 with messages that are in a plurality of formats and languages and correspond to the directory numbers that appears in entries $1700_1$–$1700_L$ in DN mapping table 1626. Thus, networks 1300 and/or 1400 are configured to selectively report messages in different formats and languages, depending upon the particular subscriber group associated with a wireless subscriber and the particular event detected by network 1300 and/or 1400.

Figure 18:
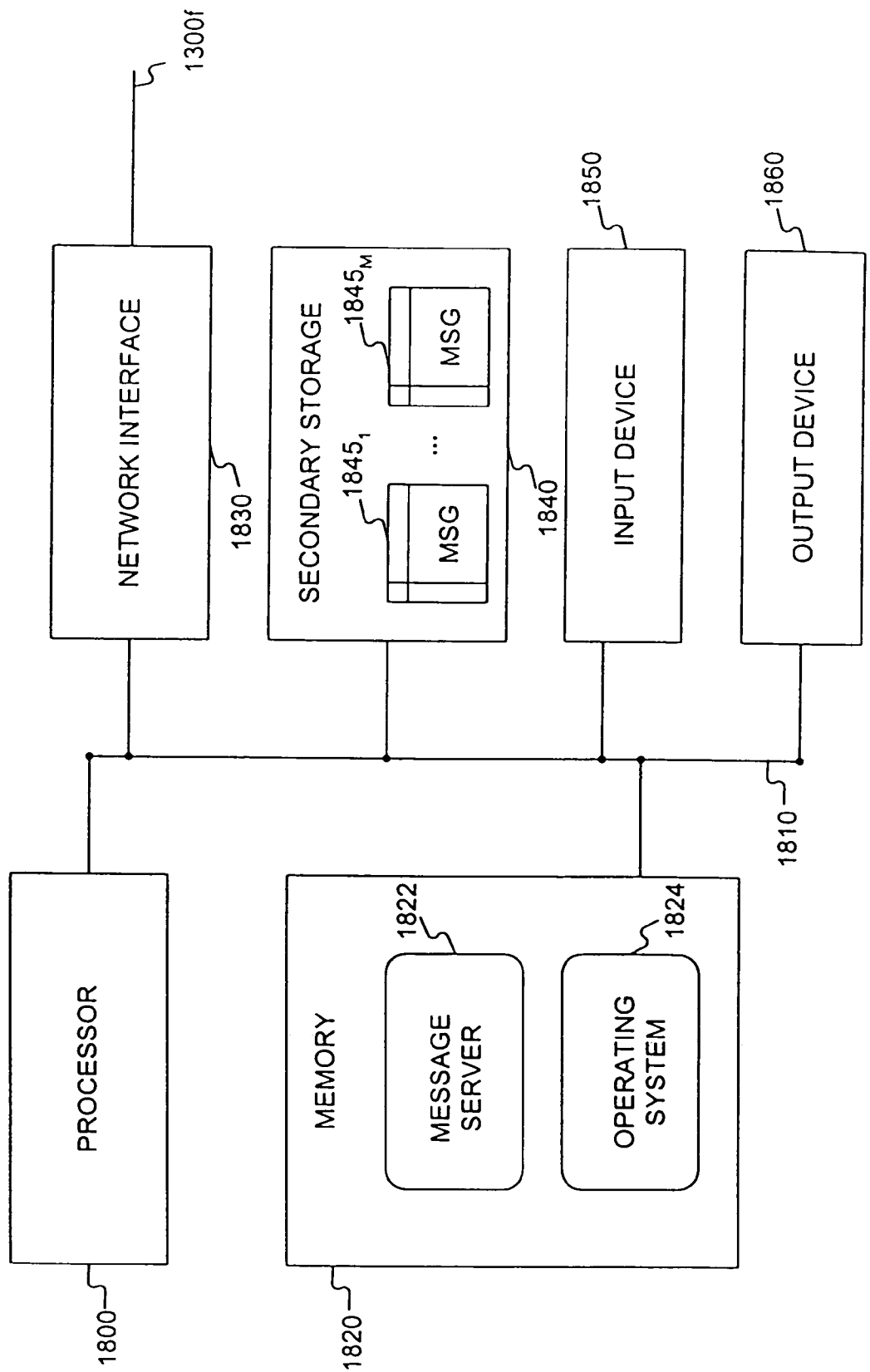
FIG. 18 is a block diagram of a message node in a wireless telecommunications network, in accordance with methods and systems consistent with the invention.

FIG. 18 is a block diagram of message node 1360, in accordance with methods and systems consistent with the invention. Although message node 1360 is described in detail, it should be understood that message node 1470 comprises similar elements and performs the same functions as message node 1360. Message node 1360 comprises a processor 1800, which connects via bus 1810 to a memory 1820, a network interface module 1830, a secondary storage 1840, an input device 1850, and an output device 1860. Message node 1360 may include a messaging system such as, Octel 250 manufactured by Lucent Technologies. Alternatively, message node 1360 may include a computer that includes a VFX/PCI board manufactured by Dialogic, an Intel Company.

Memory 1820 includes a message server 1822 and an operating system 1824. Message server 1822 includes data and software executed by processor 1800 for executing M messages $1845_1$–$1845_M$ stored in secondary storage 1840. Operating system 1824 includes data and software executed by processor 1800 for managing tasks and processor interrupts.

In response to an interrupt initiated by network interface module 1830, message server 1822 loads into memory 1820 one of messages $1845_1$–$1845_M$ that corresponds to the port on which a call is detected in network interface module 1830. Alternatively, in an embodiment where link 1800$f$ is provisioned as Direct Inward Dialing (DID) links, message server 1822 loads into memory 1820 one of messages $1845_1$–$1845_M$ that corresponds to a sequence of digits (e.g. a portion or all digits) of a directory number included in the detected call.

Message server 1822 then executes or plays the message loaded into memory 1820. After executing or playing the message, message server 1822 signals network interface module 1830 to terminate the call.

Secondary storage 1840 stores messages $1845_1$–$1845_M$ in a plurality of formats such as, voice, data, TDD, and in a plurality of languages such as, English, Spanish, French, etc. An administrator stores messages $1845_1$–$1845_M$ in secondary storage 1840 such that each message is associated with a unique port in network interface module 1830.

Input device 1850 may include an input device such as, a keyboard, and output device 1860 may include a display device.

Figure 19:
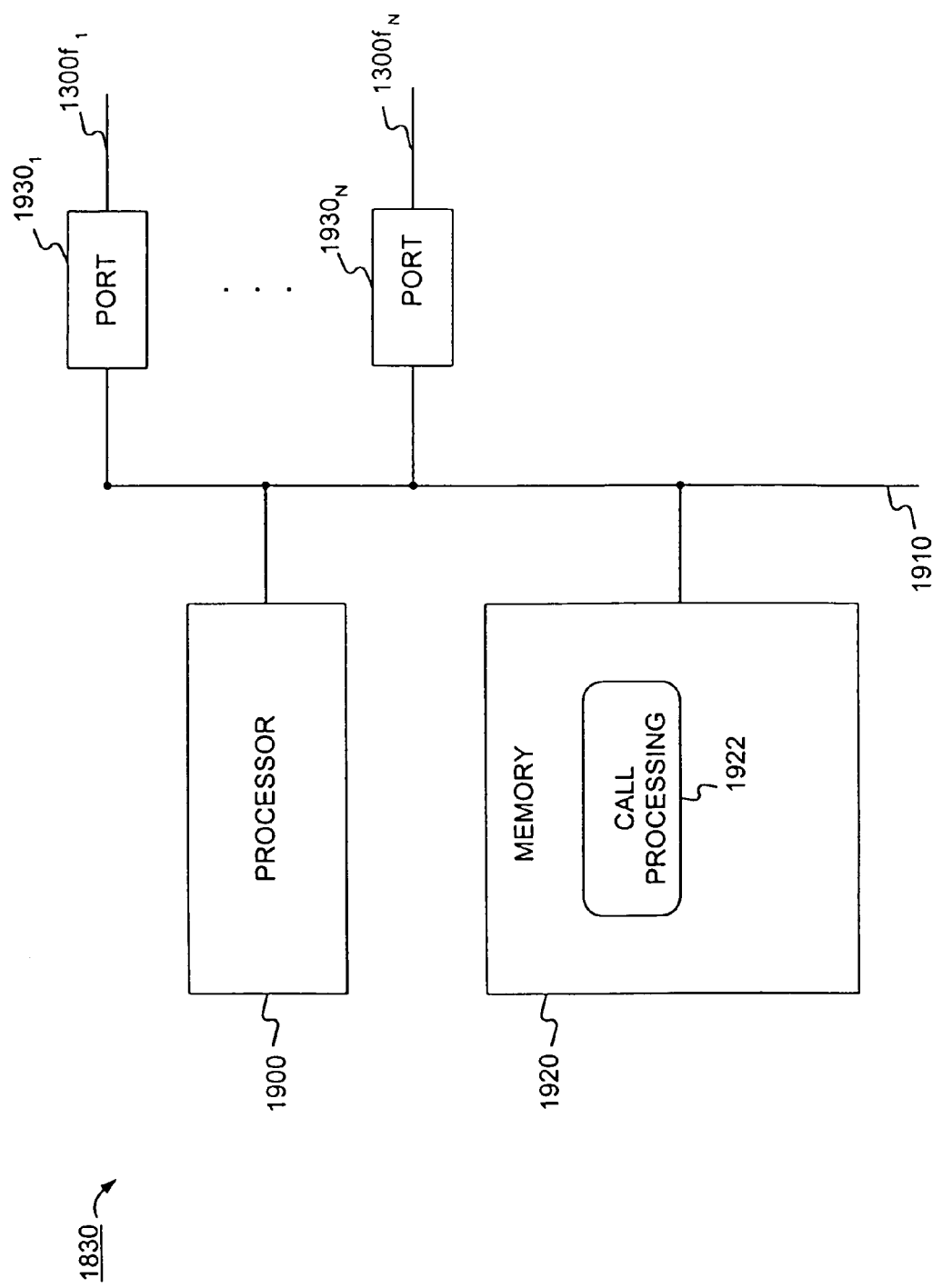
FIG. 19 is a block diagram of a network interface module in a message node in a wireless telecommunications network, in accordance with methods and systems consistent with the invention.

Network interface module 1830, which connects to link 1300$f$, includes hardware and software for processing calls that arrive on link 1300$f$. FIG. 19 is a block diagram of network interface module 1830, in accordance with methods and systems consistent with the invention. Network interface module 1830 includes a processor 1900, which connects via bus 1910 to a memory 1920, N ports $1930_1$–$1930_N$. Ports $1930_1$–$1930_N$ connect to lines $1300f_1$–$1300f_N$.

Alternatively, link 1300$f$ may be provisioned as DID links such that calls detected at ports $1930_1$–$1930_N$ include a portion (e.g., the last few digits) or all of the digits of the directory numbers associated with the calls.

Memory 1920 includes a call processing module 1922, which includes data and software executed by processor 1900 for processing calls that arrive on lines $1300f_1$–$1300f_N$. Call processing module 1922 monitors ports $1930_1$–$1930_N$, detects calls that arrive on lines $1300f_1$–$1300f_N$, and transmits an off-hook signal to network 1300 when a call is detected on any of the lines $1300f_1$–$1300f_N$. When a call is detected, call processing module 1922 initiates an interrupt in processor 1800 to notify message server 1822 as to the port on which a call is detected.

Figure 20:
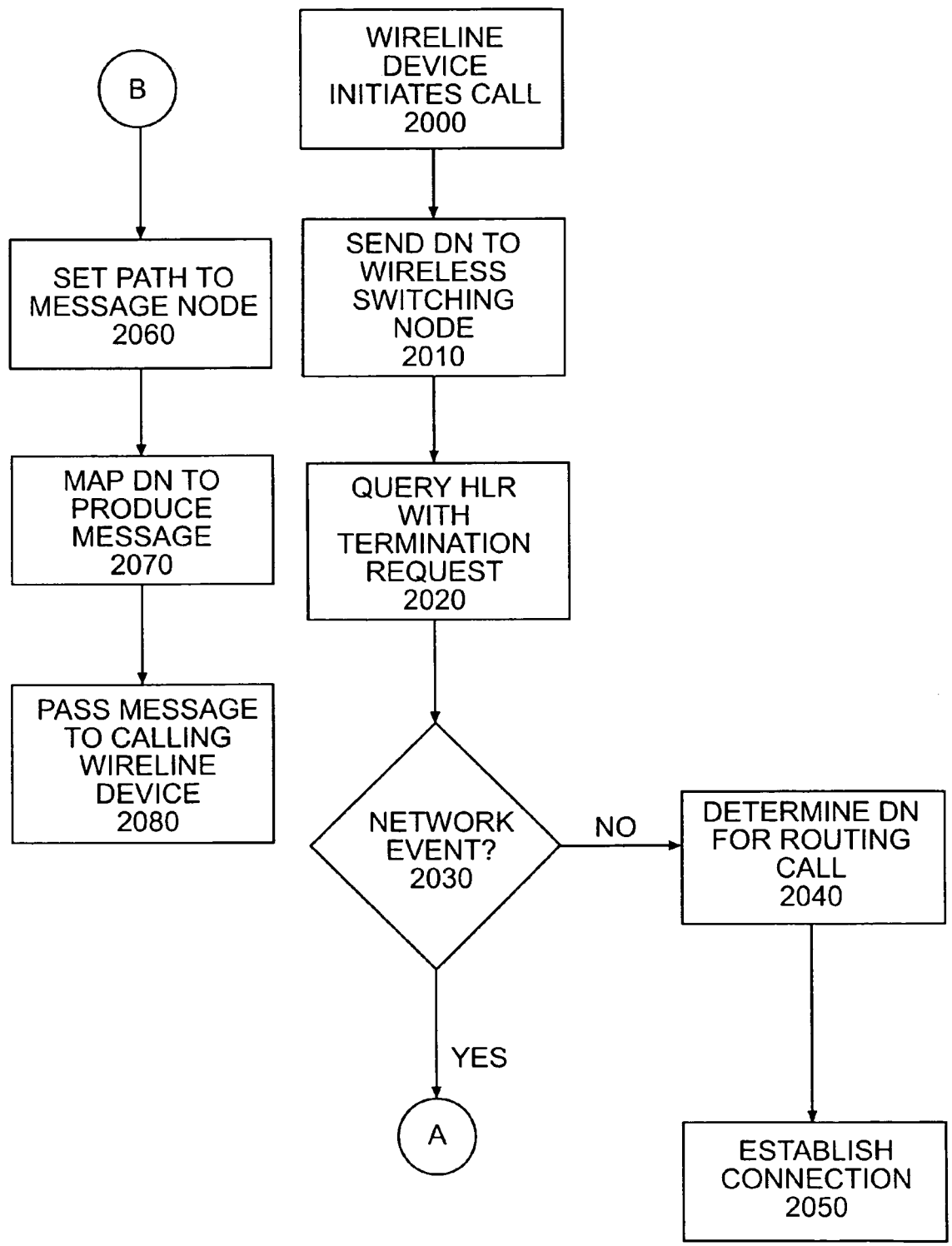
FIG. 20 is a flow chart of the steps performed by a wireless telecommunications network when processing a TerminationRequest message, in accordance with methods and systems consistent with the invention.

FIG. 20 is a flow chart of the steps performed by network 1300 when processing a TerminationRequest in accordance with methods and systems consistent with the invention. The process begins when any one of the wireline devices 1310, 1312, 1313 or 1314 attempts to call a wireless subscriber device by dialing a mobile number associated with the wireless device (Step 2000). The call request is passed to wireline switching node 1320, which analyzes the dialed number and sends it to the wireless switching node 1340 via PSTN/IXC and links 1300*a*, 1340*b* (Step 2010).

Upon receiving the request, wireless switching node 1340 recognizes parameters previously provided by HLR 1350, causing a termination trigger to be invoked, and subsequently generates a TerminationRequest 1300*d* which is sent to HLR 1350 (Step 2020), possibly through STP 1357. While processing the call request, HLR 1350 checks to determine whether the call cannot be completed by virtue of a network event or error (Step 2030).

If no error or event occurred, HLR 1350 determines a directory number DN for routing the call (Step 2040), and sends the DN to wireless switching node 1340, possibly through STP 1357. Using the DN, network 1300 eventually establishes a connection between the wireline device requesting the call and the wireless subscriber device (Step 2050). However, if a network event is detected by HLR 1350, a mapped directory number is determined and sent back to wireless switching node 1340 in a TerminationRequest response 1300*e* (Step A). This process will be described in further detail with reference to FIG. 22.

Upon receiving the TerminationRequest response, with the appended mapped directory number (B), the wireless switching node 1340 sets a path to the message node 1360 over a network trunk group 1300*f* (Step 2060). The message node 1360 maps the received mapped DN to a predetermined message in suitable format stored in an internal database 1380 (Step 2070). The predetermined message is passed and presented to the wireline device (1310, 1312, 1313 or 1314) which generated the call request (Step 2080).

The utility of this process recognizes that if the wireless subscriber utilizes a special data type, such as TDD for communication, then the wireline devices attempting to communicate with the wireless subscriber will also be expecting the same format.

Figure 21:
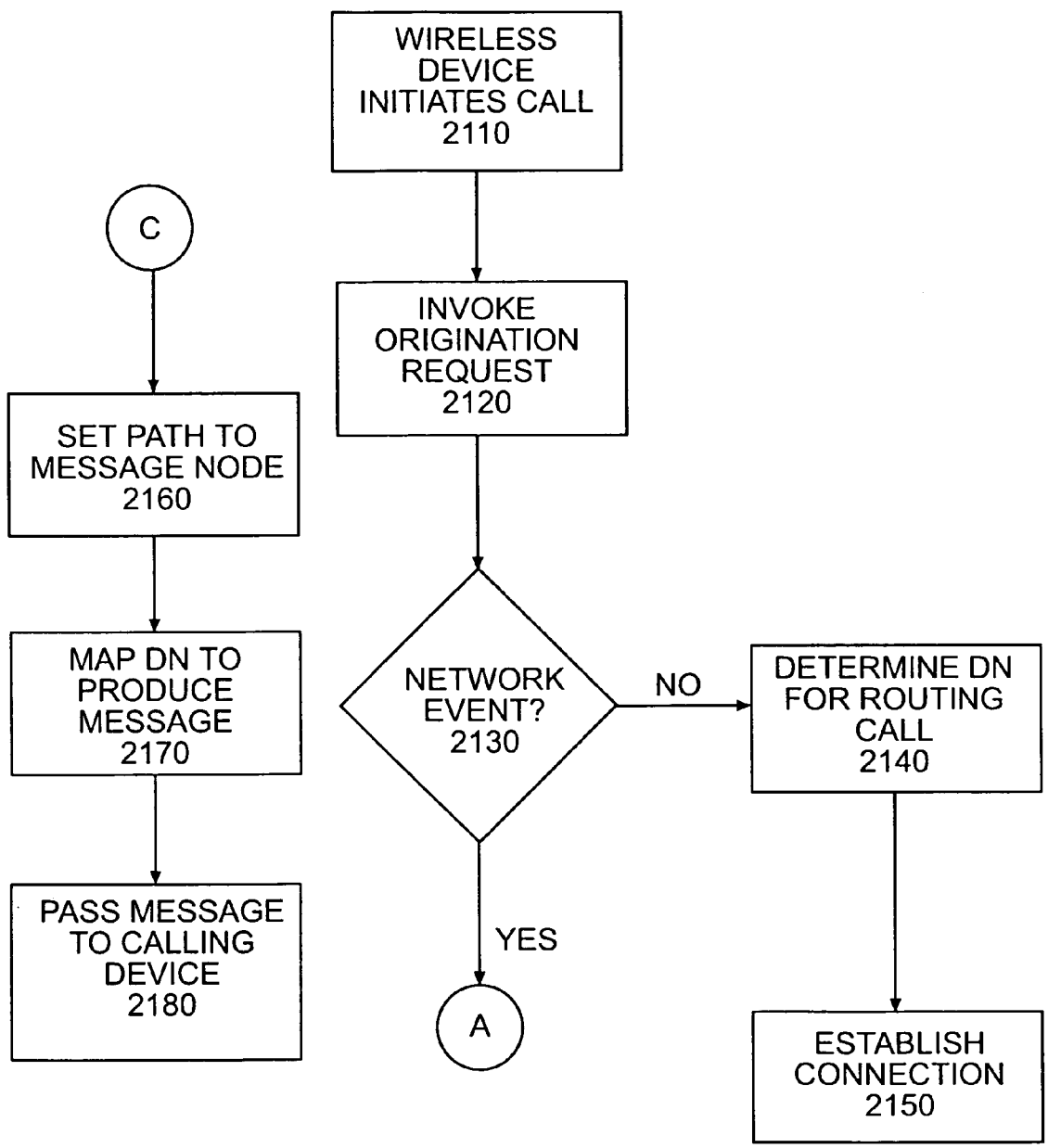
FIG. 21 is a flow chart of the steps performed by a wireless telecommunications network when processing an OriginationRequest message, in accordance with methods and systems consistent with the invention.

FIG. 21 is a flow chart of the steps performed by network 1400 when processing an OriginationRequest in accordance with methods and systems consistent with the invention. The process begins when wireless device 1410 originates a call request at wireless switching node 1430 by way of antenna 1420 and link 1400a (Step 2110).

Wireless switching node 1430 receives the call request, examines parameters previously provided by HLR 1460, causing a origination trigger to be invoked. This results in an OriginationRequest 1400c to be sent to VLR 1440, which is associated with wireless switching node 1430. The OriginationRequest is sent possibly through STP 1447. VLR 1440 passes the OriginationRequest 1400c to HLR 1460. (Step 2120), possibly through STP 1450.

HLR 1460 receives the OriginationRequest 1400c, and while processing the call request, it checks to determine whether the call cannot be completed by virtue of a network event or error (Step 2130). If no error or event occurred, HLR 1460 determines a directory number DN for routing the call (Step 2140) and sends the DN to wireless switching node 1430. Network 1400 uses the DN to eventually establish a connection between the wireless device 1410 requesting the call and the entity the wireless subscriber is attempting call (Step 2150).

However, if a network event is detected by HLR 1460, a mapped directory number is determined and sent back to wireless switching node 1430 in an OriginationRequest response 1400d, via VLR 1440 and possible through STPs 1450 and 1447 (A). This process will be described in further detail with reference to FIG. 22.

Upon receiving the OriginationRequest response with the appended mapped directory number (C), the wireless switching node 1430 sets a path to the message node 1470 over a network trunk group 1400e (Step 2160). The message node 1470 maps the received mapped DN to a predetermined message in suitable format stored in an internal database 1480 (Step 2170). The predetermined message is passed and presented to the wireless device 1410 which generated the call request (Step 2180).

Figure 22:
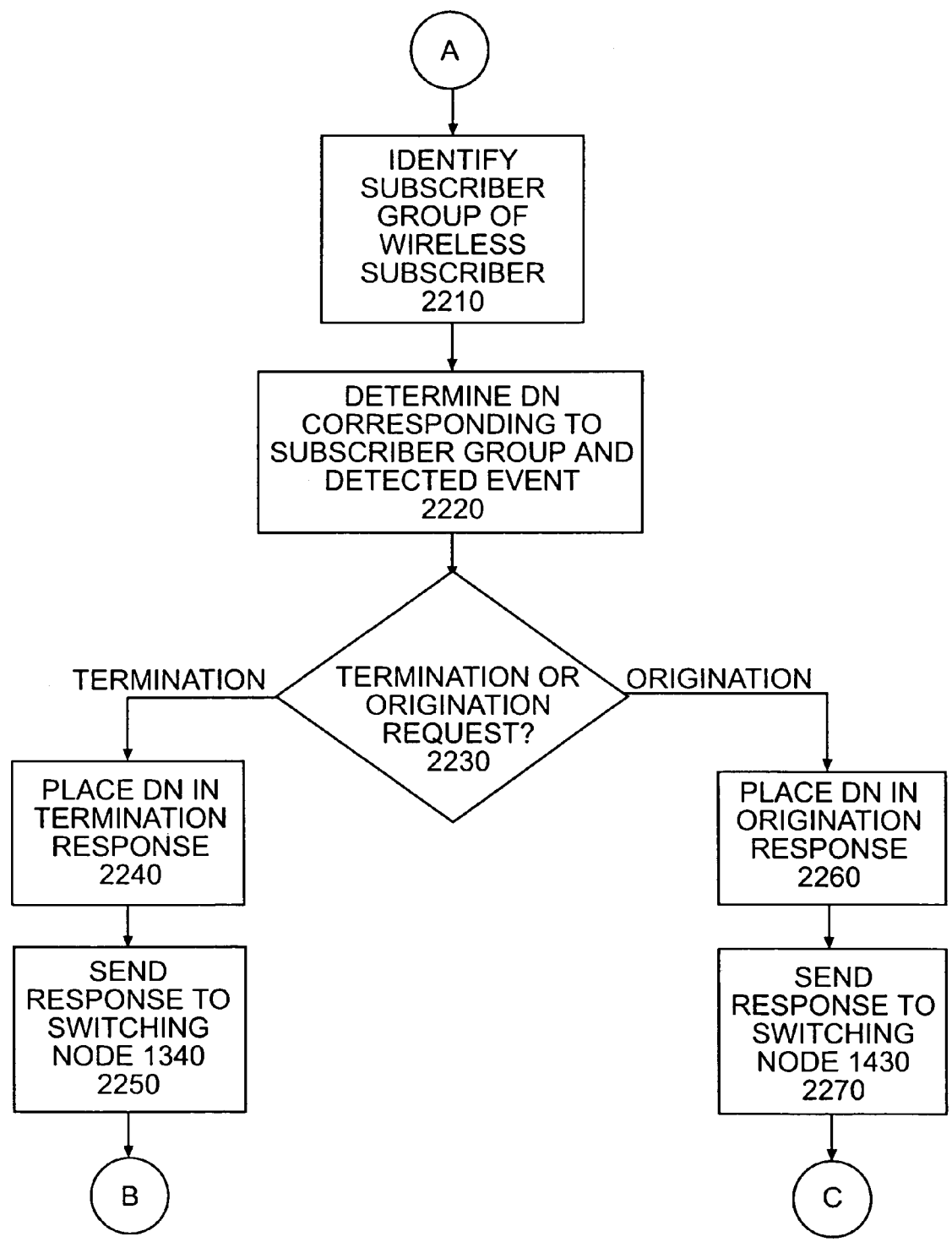
FIG. 22 is a flow chart of the steps performed by a home location register when processing a TerminationRequest or OriginationRequest message, in accordance with methods and systems consistent with the invention.

FIG. 22 is a flow chart of the steps performed by HLRs 1350 and 1460, when processing a TerminationRequest or OriginationRequest, respectively, when an error or event occurs, in accordance with methods and systems consistent with the invention.

When HLR 1350, 1460 determines that the network cannot establish the call or detects an event that must be reported, HLR 1350, 1460 determines the event code associated with that event. HLR 1350, 1460 then queries subscriber service database 1370,1480 respectively, which may include, for example, a LIDB database, to determine the subscriber group identifier associated with the calling subscriber (Step 2210).

After determining the subscriber group identifier of the wireless subscriber, HLR1350, 1460 selects from DN mapping table 1626 an entry whose index field 1701 matches, for example, the event code and the subscriber group identifier (Step 2220). HLR 1350, 1460 then reads the directory number in the directory number field 1702 of the selected entry. Depending upon the type of request (Step 2230), the appropriate HLR places the mapped DN into the corresponding response, TerminationRequest response generated by HLR 1350 (Step 2240), or OriginationRequest response generated by HLR 1460 (Step 2260).

With respect to the operations for HLR 1340, the TerminationRequest response 1300e is sent back to the wireless switching node 1340, possibly through STP 1357 (Step 2250), where the message node is contacted for message delivery, as described above with respect to FIG. 20 (B).

With respect to the operations for HLR 1460, the OriginationRequest response 1400d is sent back to wireless switching node 1430, via VLR 1440 and possibly STPs 1450 and 1447 (Step 2270), where the message node is contacted for message delivery to the wireless subscriber, as described above with respect to FIG. 21(C).

Accordingly, by selecting from DN mapping table 1626 a predetermined directory number that terminates at message node 1360, 1470 and that is based on the subscriber group identifier of the wireless subscriber and the event code associated with the detected event, HLR 1350, 1460 has identified an appropriate message in message node 1360, 1470 for reporting the detected event.

FIG. 23 is a flow chart of the steps performed by network 1400A when processing a wireless to wireless device communication, in accordance with methods and systems consistent with the invention. The process begins when wireless device 1410A originates a call request to wireless device 1470A. The call is request is sent to wireless switching node 1420A by way of antenna 1415A (Step 2310).

Wireless switching node 1420A receives the call request, examines parameters previously provided by location register 1430A, causing a origination trigger to be invoked. This results in an OriginationRequest to be sent to location register 1430A, which is associated with wireless switching node 1420A. The OriginationRequest is sent possibly through STP 1425A. (Step 2315).

Location register 1430A receives the OriginationRequest, and while processing the call request, it checks to determine whether the call cannot be completed by virtue of a network event or error (Step 2320). If no error or event occurred, location register 1430A determines a directory number DN for routing the call (Step 2325). Network 1400A uses the DN to eventually establish a connection between the wireless device 1410A and wireless device 1470A, via PSTN 1435A. (Step 2330).

However, if a network event is detected by location register 1430A, a mapped directory number is determined and sent back to wireless switching node 1420A in an OriginationRequest response, possibly through STP 1425A. (D).

Referring back to step 2330, upon receiving the request, wireless switching node 1460A recognizes parameters previously provided by location register 1450A, causing a termination trigger to be invoked, and subsequently generates a TerminationRequest which is sent to location register 1450A (Step 2335), possibly through STP 1355A. While processing the call request, location register 1450A checks to determine whether the call cannot be completed by virtue of a network event or error (Step 2340).

If no error or event occurred, location register 1450A determines a directory number DN for routing the call (Step 2345), and sends the DN to wireless switching node 1460A, possibly through STP 1455A. Using the DN, network 1400A eventually establishes a connection between the wireless device 1410A and wireless device 1470A (Step 2350). However, if a network event is detected by location register 1450A, a mapped directory number is determined and sent back to wireless switching node 1460A in a TerminationRequest response (D).

In the event a network error event has been detected by location registers 1430A and 1450A, they determine the event code associated with the network event. Location registers 1430A and 1450A then query subscriber service database 1445A and 1480A respectively, which may include, for example, a LIDB database, to determine the subscriber group identifier associated with the calling subscriber (Step 2355).

After determining the subscriber group identifier of the wireless subscriber, location registers 1430A and 1450A select from a DN mapping table, an entry whose index field matches, for example, the event code and the subscriber group identifier (Step 2360). Location registers 1430A and 1450A then read the directory number in the directory number field of the selected entry. Depending upon the type of request (Step 2365), the appropriate location register places the mapped DN into the corresponding response: TerminationRequest response generated by location register 1350A (Step 2370); or OriginationRequest response generated by location register 1430A (Step 2380).

With respect to the operations for the TerminationRequest response, the response is sent back to the wireless switching node 1460A, possibly through STP 1355A (Step 2375), where message node 1475A is contacted for message delivery. Upon receiving the TerminationRequest response with the appended mapped directory number, the wireless switching node 1460A sets a path to the message node 1475A over a network trunk group (Step 2390). The message node 1475A maps the received mapped DN to a predetermined message in suitable format stored in an internal database 1480A (Step 2392). The predetermined message is passed and presented to the device which generated the call request, in this case wireless device 1410A (Step 2395).

With respect to the operations for the OriginationRequest response, the response is sent back to wireless switching node 1420A, possibly through STPs 1425A (Step 2385), where message node 1440A is contacted for message delivery to the wireless subscriber. Upon receiving the OriginationRequest response with the appended mapped directory number, the wireless switching node 1420A sets a path to the message node 1440A over a network trunk group (Step 2390). The message node 1440A maps the received mapped DN to a predetermined message in suitable format stored in an internal database 1445A (Step 2392). The predetermined message is passed and presented to the wireless device 1410A which generated the call request (Step 2395).

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

What is claimed is:

1. A method for reporting events in a wireless intelligent network, said method comprises the steps of:
    identifying a group associated with a wireless subscriber when an event that indicates an error in routing a call to the wireless subscriber is detected;
    determining a directing number associated with the identified group and the detected event;
    establishing a call between the wireless subscriber and a message node in the network using the determined directory number;
    generating a message by the message node based on the directory number and a profile associated with the identified group; and
    reporting the message to the wireless subscriber.

2. The method of claim 1, wherein the identifying step comprises the step of:
    identifying a subscriber group associated with the wireless subscriber when the event is detected.

3. The method of claim 1, wherein the identifying step comprises the step of:
    identifying the group when the detected event is associated with a call requested by the wireless subscriber.

4. The method of claim 1, wherein the identifying step comprises the step of:
    identifying the group when the detected event is associated with a call that is requested by the wireless subscriber and that cannot be established in the network.

5. The method of claim 1, wherein the identifying step comprises the step of:
    retrieving from a subscriber services database in the network a group identifier associated with the calling wireless subscriber.

6. The method of claim 1, wherein the determining step comprises the step of:
    selecting the directory number from a table that includes one or more predetermined directory numbers indexed by event identifiers and group identifiers.

7. The method of claim 1, wherein the reporting step comprises the step of:
    executing the message in a voice format.

8. The method of claim 1, wherein the reporting step comprises the step of:
    executing the message in a telecommunications device for deaf (TDD) format.

9. The method of claim 1, wherein the reporting step comprises the step of:
    executing the message in a data format.

10. A method for reporting events that indicate at least one error associated with calls requested by wireless subscribers in a wireless intelligent network, wherein the wireless subscribers are members of subscriber groups, said method comprises the steps of:
    associating one or more directory numbers with the events and the subscriber groups;
    storing, in a message node in the network, messages corresponding to the associated directory numbers, respectively;
    establishing calls, when the network detects the events that indicate the at least one error, between the message node and a subscriber based on the directory numbers, wherein the message node selects one or more messages that are provided to a subscriber based on the directory numbers and the associated subscriber group.

11. The method of claim 10, wherein the storing step comprises the step of:
    storing the messages in a plurality of predetermined formats.

12. The method of claim 10, wherein the storing step comprises the step of:
    storing the messages in a plurality of predetermined languages.

13. The method of claim 10, wherein the establishing step comprises the step of:
    establishing the calls to the message node when a location register in the network detects the events.

14. The method of claim 10, wherein the establishing step comprises the step of:
    requesting a route from a location register in the network when one of the wireless subscribers requests a call to another one of the wireless subscribers.

15. A method for reporting events in a wireless intelligent network comprising a switching node and a message node interconnected by a network, said method comprises the steps of:
    receiving, at the switching node, a request for establishing a call from a wireline subscriber to a wireless subscriber in the wireless intelligent network;

identifying a location register in the wireless intelligent network for routing the call;
receiving, at the switching node, a directory number from the identified location register; and
establishing the call from the wireline subscriber to the message node based on the received directory number and a subscriber group associated with the wireless subscriber, when an event that indicates an error associated with the call is detected.

16. The method of claim 15, further comprising the step of:
terminating the call established from the wireline subscriber to the message node when a request for disconnect is received from the wireline subscriber or the message node.

17. The method of claim 15, wherein the receiving step comprises the step of:
receiving the directory number in a call request response generated by the location register.

18. A method for reporting events in a wireless network comprising a switching node, a location register, and a message node, said method comprises the steps of:
receiving, at the location register, a request from the switching node for routing a call from a first subscriber to a second subscriber in the wireless network;
identifying a group associated with the first subscriber when an event that indicates an error associated with the call is detected;
selecting a directory number based on the identified group and the detected event; and
sending the selected directory number to the switching node such that the call is established from the first subscriber to the message node to allow the message node to provide to the first subscriber a message that is selected based on the directory number and a profile associated with the identified group.

19. The method of claim 18, wherein the selecting step comprises the step of:
selecting the directory number from a plurality of predetermined directory numbers that are indexed by event identifiers and group identifiers.

20. A wireless switching node, comprising:
a memory including:
a structure for identifying a location register representative of an identified group and an event that indicates an error associated with a call in a wireless network when the switching node receives a request for establishing the call from a first subscriber to a second subscriber in the wireless network, wherein the structure includes a trigger indexed by a variable number of digits in a directory number of the first subscriber; and
computer-readable code for establishing the call from the first subscriber to a message node in the wireless network when the event is detected; and
a processor for executing he computer-readable code.

21. The wireless switching node of claim 20, wherein the structure includes a trigger in indexed by an area code in a directory number of the first subscriber.

22. The wireless switching node of claim 20, wherein the structure includes a trigger in indexed by an area code and an office code in the directory number of the first subscriber.

23. A location register, comprising:
a memory including:
a structure for storing predetermined directory numbers associated with events that indicate errors associated with calls in a wireless network and groups in the wireless intelligent network, wherein the predetermined directory numbers correspond, respectively, to message stored in a message node in the wireless intelligent network; and
computer-readable code for detecting at least one of the events that indicate errors in the wireless network when one subscriber requests a call to another subscriber, identifying a group associated with the one subscriber requesting the call, and selecting, based on the detected event and the identified group, one of the stored predetermined directory numbers that is used to establish communications between the one subscriber and the message node and is used by the message node to select one of the messages to be sent to the one subscriber; and
a processor for executing the computer-readable code.

24. A message node, comprising:
a storage module for storing messages associated, respectively, with predetermined directory numbers that correspond to events that indicate errors in a wireless intelligent network and correspond to groups with profiles associated with wireless subscribers;
a memory including computer-readable code for selecting one of the messages based on the profiles when the wireless intelligent network detects at least one of the events, establishing a call to one of the predetermined directory numbers, and providing the selected message to a subscriber associated with the one predetermined directory number; and
a processor for executing the computer-readable code.

25. The message node of claim 24, wherein the messages are stored in a plurality of formats.

26. The message node of claim 24, wherein at least one of the messages is stored in a voice format.

27. The message node of claim 24, wherein at least one of the messages is stored in a telecommunications for deaf (TDD) format.

28. Th message node of claim 24, wherein at least one of the messages is stored in a data format.

29. The message node of claim 24, wherein the messages are stored in a plurality of languages.

30. A computer-readable medium capable of configuring a computer to perform a method for reporting events in a wireless intelligent network, said method comprising the steps of:
receiving a request for establishing a call from a first subscriber to a second subscriber in the wireless intelligent network;
requesting a route from a location register in the network;
receiving from the location register a directory number;
establishing the call from the first subscriber to a message node in the wireless intelligent network based on the received directory number and a subscriber group associated with the first subscriber, when an event that indicates an error associated with the call is detected; and
providing a message to the first subscriber based on the directory number, the event and a profile associated with the subscriber group corresponding to the first subscriber.

31. A method for reporting events in a wireless intelligent network, said method comprises the steps of:
identifying a group associated with a wireless subscriber when an event that indicates an error in routing a call to the wireless subscriber is detected;
determining a directory number from a table that includes one or more predetermined directory numbers indexed by event identifiers that are each associated with an event and group identifiers that are each associated with a subscriber group; and reporting to a subscriber attempting to communicate with the wireless subscriber, a message associated with the determined directory number.

32. The method of claim 31, wherein the identifying step comprises the step of:

identifying a subscriber group associated with the wireless subscriber when the event is detected.

33. The method of claim 31, wherein the identifying step comprises the step of:

identifying the group when the detected event is associated with a call requested to the wireless subscriber.

34. The method of claim 31, therein the identifying step comprises the step of:

identifying the group when the detected event is Associated with a call that is requested by the subscriber attempting to communicate with the wireless subscriber and that cannot be established in the wireless intelligent network.

35. The method of claim 34, wherein the identifying step comprises the step of:

retrieving from a subscriber services database in the wireless intelligent network, a group identifier associated with the wireless subscriber.

36. The method of claim 31, wherein the reporting step comprises the step of:

establishing a call from the wireless subscriber to a message node in the network using the determined directory number.

37. The method of claim 31, wherein the reporting step comprises the step of:

executing the message in a voice format.

38. The method of claim 31, wherein the reporting step comprises the step of:

executing the message in a telecommunication device for deaf (TDD) format.

39. The method of claim 31, wherein the reporting step comprises the step of:

executing the message in a data format.

* * * * *